US012586523B2

(12) United States Patent
Kim et al.

(10) Patent No.: US 12,586,523 B2
(45) Date of Patent: Mar. 24, 2026

(54) DISPLAY DEVICE

(71) Applicant: SAMSUNG DISPLAY CO., LTD., Yongin-si (KR)

(72) Inventors: Hyomin Kim, Yongin-si (KR); Sang Min Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/584,318

(22) Filed: Feb. 22, 2024

(65) Prior Publication Data

US 2024/0379056 A1 Nov. 14, 2024

(30) Foreign Application Priority Data

May 11, 2023 (KR) ........................ 10-2023-0061209

(51) Int. Cl.
*G09G 3/3233* (2016.01)

(52) U.S. Cl.
CPC ..................... *G09G 3/3233* (2013.01); *G09G 2300/0819* (2013.01); *G09G 2310/027* (2013.01); *G09G 2320/0233* (2013.01); *G09G 2320/029* (2013.01); *G09G 2380/10* (2013.01)

(58) Field of Classification Search
CPC ........... G09G 3/3233; G09G 2310/027; G09G 2320/0233; G09G 2320/029; G09G 2380/10; G09G 2330/021; G09G 3/3406
See application file for complete search history.

(56) References Cited

U.S. PATENT DOCUMENTS

| | | | | |
|---|---|---|---|---|
| 9,622,326 B1 * | 4/2017 | Devyver | G09G 3/3406 | |
| 11,017,733 B2 * | 5/2021 | Noh | G06F 1/1643 | |
| 11,543,904 B2 | 1/2023 | Bok et al. | | |
| 2010/0164883 A1 * | 7/2010 | Ahn | G06F 3/042 | 345/173 |
| 2012/0223925 A1 * | 9/2012 | Yamamoto | G01J 1/46 | 250/206 |
| 2014/0313217 A1 * | 10/2014 | Walley | G09G 3/006 | 345/589 |
| 2017/0076654 A1 * | 3/2017 | Wang | G09G 3/2074 | |
| 2021/0056899 A1 * | 2/2021 | Bae | G09G 3/3233 | |
| 2023/0016151 A1 | 1/2023 | Ko et al. | | |

FOREIGN PATENT DOCUMENTS

| | | |
|---|---|---|
| KR | 10-0573134 B1 | 4/2006 |
| KR | 10-0685398 B1 | 2/2007 |
| KR | 10-2019-0105949 A | 9/2019 |
| KR | 10-2021-0086907 A | 7/2021 |
| KR | 10-2021-0157711 A | 12/2021 |
| KR | 10-2023-0009636 A | 1/2023 |

* cited by examiner

*Primary Examiner* — Matthew A Eason
*Assistant Examiner* — Scott D Au
(74) *Attorney, Agent, or Firm* — F. CHAU & ASSOCIATES, LLC

(57) ABSTRACT

A display device includes a display panel including a plurality of pixels and a plurality of sensors, which are positioned in a display area, a first logic circuit that receives a plurality of illuminance values sensed by the plurality of sensors, and generates illuminance mapping data by mapping the plurality of illuminance values to each of the pixels, and a second logic circuit that corrects image data corresponding to the plurality of pixels based on the illuminance mapping data to generate corrected image data for output to the display panel.

18 Claims, 11 Drawing Sheets

DISPLAY DEVICE

CROSS-REFERENCE TO RELATED APPLICATIONS

This patent application claims priority under 35 U.S.C. § 119 to Korean Patent Application No. 10-2023-0061209 filed on May 11, 2023, in the Korean Intellectual Property Office, the disclosure of which is incorporated by reference in its entirety herein.

1. Technical Field

Embodiments of the present disclosure described herein is generally directed to a display device having reduced power consumption and increased visibility.

2. Discussion of Related Art

A display device is a connection medium between a user and information. Examples of the display device include organic light emitting display devices and quantum dot light emitting display devices. The display device may be used in multi-media devices such as a television, a mobile phone, a tablet computer, a navigation system, and a game console.

The display device may include various functions for providing information to a user by displaying an image or organically communicating with the user, such as detecting a user input. The display device may be configured to detect biometric information provided by a user or information about the environment. For example, the display device may include a capacitive touch sensor that detects a capacitance change, an optical sensor that detects incident light, or an ultrasonic sensor that detects a vibration.

However, it may be difficult for a user to properly view images on the display device when the environment is excessively bright due to sunlight, and the display device may expend more energy than is necessary.

SUMMARY

Embodiments of the present disclosure provide a display device having reduced power consumption and increased visibility.

According to an embodiment, a display device includes a display panel, a first logic circuit, and a second logic circuit. The display panel includes a plurality of pixels and a plurality of sensors, which are positioned in a display area, The first logic circuit receives a plurality of illuminance values sensed by the plurality of sensors, and generates illuminance mapping data by mapping the plurality of illuminance values to each of the pixels. The second logic circuit corrects image data corresponding to the plurality of pixels based on the illuminance mapping data to generate correction image data for output to the display panel.

The display device may further include a panel driver that controls an operation of the display panel, and a driving controller that controls of an operation of the panel driver. The correction image data may be provided to the driving controller.

The panel driver may include a data driver, a scan driver, a light emitting driver, and a sensor controller. The data driver, the scan driver, and the light emitting driver control the plurality of pixels. The scan driver and the sensor controller control the plurality of sensors, and the sensor controller outputs the plurality of illuminance values to the first logic circuit.

The second logic circuit may be configured to determine a correction weight based on the illuminance mapping data.

The second logic circuit may be configured to determine the correction weight for each of the plurality of pixels, and to generate the correction image data obtained by correcting the image data based on the correction weight.

The display area may be divided into a plurality of areas. The second logic circuit may be configured to determine the correction weight for each of the plurality of areas, and to generate the correction image data by correcting the image data based on the correction weight.

The display panel may operate in one of a first mode having a first maximum brightness, and a second mode having a second maximum brightness brighter than the first maximum brightness.

The display area may include a first area and a second area. In the second mode, a first luminance value of an image corresponding to a first grayscale displayed in the first area may be lower than a second luminance value of an image corresponding to the first grayscale displayed in the second area.

An illuminance value measured in the first area may be lower than an illuminance value measured in the second area.

Each of the plurality of pixels may include a pixel driving circuit and a light emitting element. Each of the plurality of sensors may include a sensor driving circuit and a sensing element.

The sensing element may be an organic photodiode.

The number of the plurality of pixels may be greater than the number of the plurality of sensors.

The display panel may be an in-vehicle display panel.

According to an embodiment, a display device includes a display panel and a first logic circuit. The display panel includes a plurality of pixels and a plurality of sensors, which are positioned in a display area. The first logic circuit determines a correction weight according to a location within the display area based on a plurality of illuminance values sensed by the plurality of sensors, and generates correction image data by correcting image data corresponding to the plurality of pixels based on the correction weight for output to the display panel.

The display device may further include a second logic circuit that generates illuminance mapping data by mapping the plurality of illuminance values to each of the pixels. The second logic circuit may be configured to determine the correction weight based on the illuminance mapping data.

The display panel may operate in one of a first mode having a first maximum brightness, and a second mode having a second maximum brightness brighter than the first maximum brightness. The display area may include a first area and a second area. In the second mode, a first luminance value of an image corresponding to a first grayscale displayed in the first area may be lower than a second luminance value of an image corresponding to the first grayscale displayed in the second area. An illuminance value measured in the first area may be lower than an illuminance value measured in the second area.

The first logic circuit may be configured to determine the correction weight for each of the plurality of pixels, and to generate the correction image data obtained by correcting the image data based on the correction weight.

The display area may be divided into a plurality of areas. The first logic circuit may be configured to determine the correction weight for each of the plurality of areas, and to generate the correction image data by correcting the image data based on the correction weight.

According to an embodiment, a display device includes a display panel and a first logic circuit. The display panel includes a plurality of pixels and a plurality of sensors, which are positioned in a display area, and operating in one of a first mode having a first maximum brightness, and a second mode having a second maximum brightness brighter than the first maximum brightness. The first logic circuit corrects image data corresponding to the plurality of pixels based on a plurality of illuminance values sensed by the plurality of sensors to generate correction image data for output to the display panel. The display area includes a first area and a second area. In the second mode, a first luminance value of an image corresponding to a first grayscale displayed in the first area is lower than a second luminance value of an image corresponding to the first grayscale displayed in the second area. An illuminance value measured in the first area is lower than an illuminance value measured in the second area.

The display device may further include a second logic circuit that generates illuminance mapping data by mapping the plurality of illuminance values to each of the pixels. The first logic circuit may be configured to determine a correction weight according to a location within the display area based on the illuminance mapping data.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
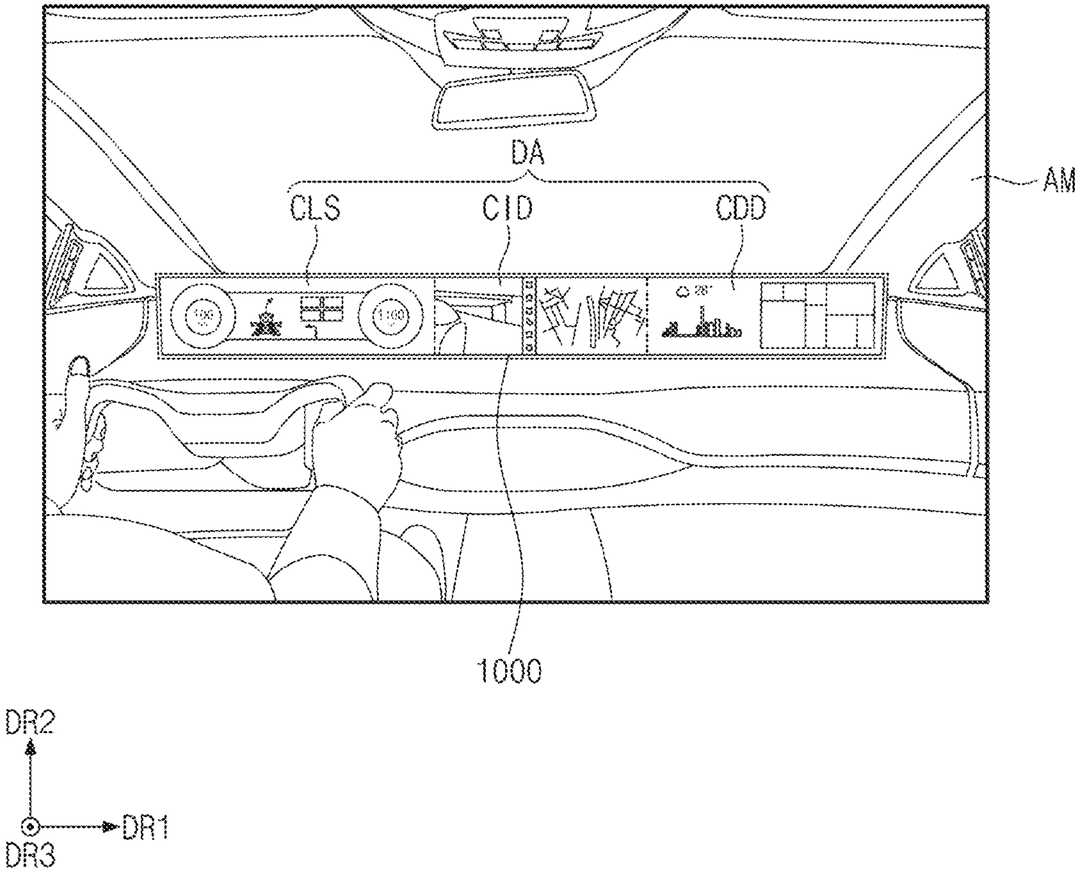
FIG. 1 is a view showing an inside of a vehicle, in which a display device is positioned, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. The term "and/or" includes one or more combinations in each of which associated elements are defined.

The terms "part" and "unit" mean a software component or hardware component that performs a specific function. For example, the hardware component may include a field-programmable gate array (FPGA) or an application-specific integrated circuit (ASIC). The software component may refer to executable codes and/or data used by the executable codes in an addressable storage medium. Accordingly, the software components may be, for example, object-oriented software components, class components, and task components, and may include processes, functions, attributes, procedures, subroutines, program code segments, drivers, firmware, microcodes, circuits, data, databases, data structures, tables, arrays, or variables.

Hereinafter, embodiments of the present disclosure will be described with reference to accompanying drawings.

FIG. 1 is a view showing an inside of a vehicle AM, in which a display device 1000 is positioned, according to an embodiment of the present disclosure.

Referring to FIG. 1, a display device 1000 may be a device activated depending on an electrical signal. For example, the display device 1000 may display an image on a display area DA. The image may include a still image as well as a moving image.

A display surface on which an image is displayed may correspond to a front surface of the display device 1000. The front surface of the display device 1000 may be a plane parallel to a first direction DR1 and a second direction DR2. However, embodiments of the disclosure are not limited thereto. For example, the front surface of the display device 1000 may be the display device 1000 curved in a predetermined direction. The front surface of the display device 1000 may have various curved shapes so as to be suitable for the shape of an installation target surface of a vehicle AM.

A thickness direction of the display device 1000 may be parallel to a third direction DR3 intersecting the first direction DR1 and the second direction DR2. Accordingly, front surfaces (or upper surfaces) and back surfaces (or lower surfaces) of members constituting the display device 1000 may be defined based on the third direction DR3.

In an embodiment of the present disclosure, the display device 1000 is disposed inside the vehicle AM. Accordingly, the display area DA of the display device 1000 may include at least one of a cluster area CLS, a central information area CID, and a passenger seat area CDD. For example, FIG. 1 shows that the display area DA includes a cluster area CLS, a central information area CID, and a passenger seat area CDD. However, at least one of the areas may be omitted.

Various alarm displays indicating a vehicle speed, an engine rotation speed, a mileage, a fuel status, and whether the vehicle AM operates normally may be displayed in the cluster area CLS. Various vehicle operation information such as navigation information, audio, air conditioning and heating may be displayed in the central information area CID. As well as information related to driving of the vehicle AM, various information not related to driving of the vehicle AM may be displayed in the passenger seat area CDD as a display area for the passenger seat.

As the display device 1000 is applied to various products (e.g., a vehicle), the size or aspect ratio (e.g., a picture ratio) of the display device 1000 may also vary. Accordingly, a deviation in the degree of exposure to external light may occur within the display device 1000.

According to an embodiment of the present disclosure, illuminance may be sensed by using sensors FX (see FIG. 4) distributed and positioned in the display area DA. The illuminance may be the amount of light falling into or illuminating a given surface area. The display device 1000 may be configured to generate illuminance mapping data, which is obtained by mapping a plurality of illuminance values, and to determine a correction weight based on the illuminance mapping data. Accordingly, in addition to optimizing a contrast ratio (CR) due to external light, a brightness increase correction for increasing the maximum brightness is not performed on a part of the display area DA in certain situations, and thus the power consumption of the display device 1000 may be reduced. In addition, because the maximum brightness of only the necessary part is increased, the lifetime of the display device 1000 may be increased.

Figure 2:
FIG. 2 is a plan view of a display device, according to an embodiment of the present disclosure.

FIG. 2 is a plan view of a display device 1000-1, according to an embodiment of the present disclosure.

Referring to FIG. 2, the display device 1000-1 may be applied to electronic devices such as mobile phones, tablet PCs, smart watches, notebook computers, computers, or smart televisions. FIG. 2 illustrates a mobile phone as an example.

In an embodiment of the present disclosure, the display device 1000 may display an image through the display area DA. The display area DA may include a surface defined by the first direction DR1 and the second direction DR2.

Figure 3:
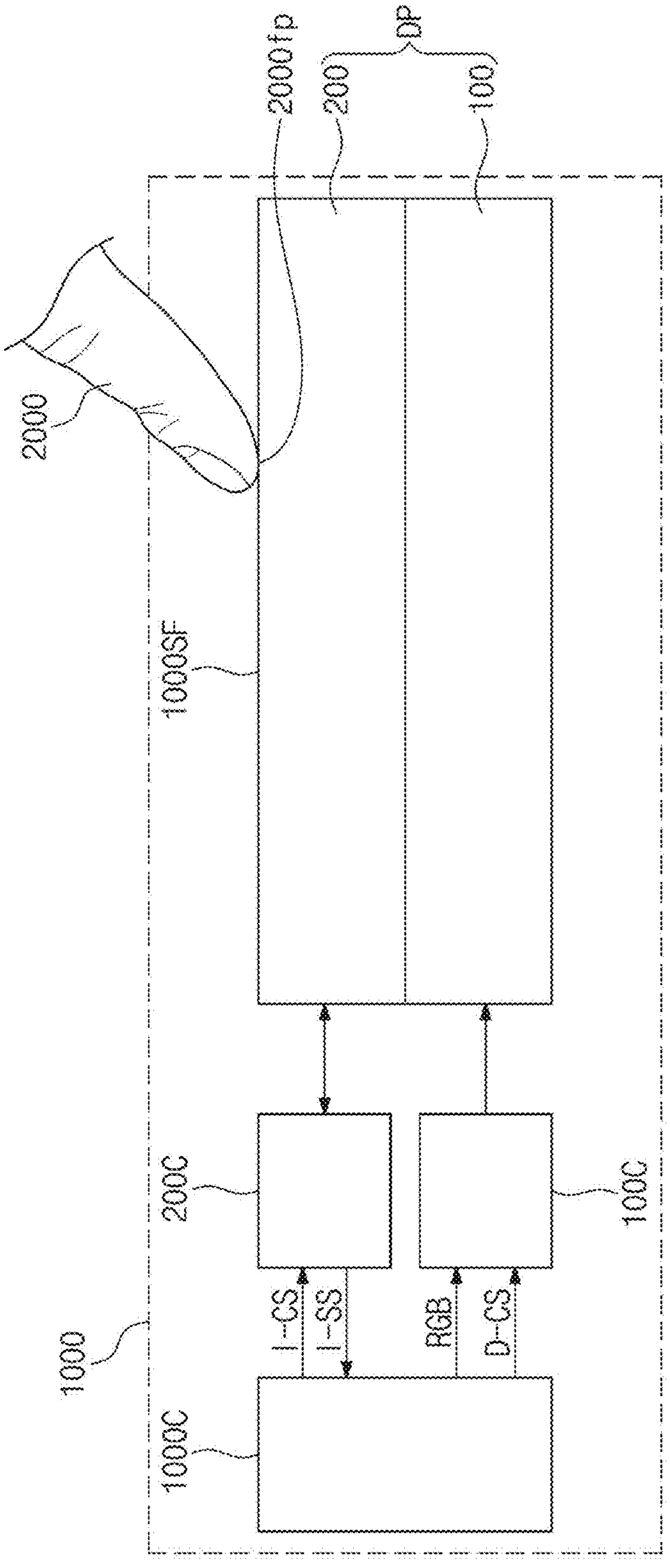
FIG. 3 is a block diagram schematically illustrating a use example of a display device, according to an embodiment of the present disclosure.

FIG. 3 is a block diagram schematically illustrating a use example of the display device 1000, according to an embodiment of the present disclosure.

Referring to FIG. 3, the display device 1000 may include a display panel DP, a display driver 100C (e.g., a first driver circuit), a sensor driver 200C (e.g., a second driver circuit), and a main driver 1000C (e.g., a third driver circuit). The display panel DP may include a display layer 100 and a sensor layer 200 disposed on the display layer 100.

In an embodiment of the present disclosure, the sensor layer 200 may be omitted. In an embodiment of the present disclosure, the sensor layer 200 is formed only on a portion of the display layer 100. For example, referring to FIG. 1 and FIG. 3, the central information area CID, and the passenger seat area CDD may include the sensor layer 200 to detect external input. In an embodiment, the cluster area CLS does not include the sensor layer 200.

The display layer 100 may be a component that substantially generates an image. The display layer 100 may be a light emitting display layer. For example, the display layer 100 may be an organic light emitting display layer, an inorganic light emitting display layer, an organic-inorganic light emitting display layer, a quantum dot display layer, a micro-LED display layer, or a nano-LED display layer. In addition, the display layer 100 may include sensors FX (see FIG. 4) that respond to light or sense light. The sensors FX may sense external light or may sense light reflected by a user's fingerprint 2000*fp*.

The sensor layer 200 may be disposed on the display layer 100. The sensor layer 200 may sense an external input 2000 applied from the outside. The external input 2000 may include any input means capable of providing a change in capacitance. For example, the sensor layer 200 may sense not only a passive-type input means such as a user's body, but also an input by an active-type input means that provides a driving signal.

The main driver 1000C may control overall operations of the display device 1000. For example, the main driver 1000C may control operations of the display driver 100C and the sensor driver 200C. The main driver 1000C may include at least one microprocessor and may further include a graphics controller. The main driver 1000C may be an application processor, a central processing unit, or a main processor.

The display driver 100C may drive the display layer 100. The display driver 100C may receive image data RGB and a control signal D-CS from the main driver 1000C. The control signal D-CS may include various signals. For example, the control signal D-CS may include a vertical synchronization signal, a horizontal synchronization signal, a main clock signal, and a data enable signal. The display driver 100C may generate the vertical synchronization signal and the horizontal synchronization signal for controlling timing for providing a signal to the display layer 100, based on the control signal D-CS.

The sensor driver 200C may drive the sensor layer 200. The sensor driver 200C may receive a control signal I-CS from the main driver 1000C. The control signal I-CS may include a clock signal or a mode determination signal for determining a driving mode of the sensor driver 200C.

The sensor driver 200C may calculate coordinate information of an input based on a signal received from the sensor layer 200 and may provide the main driver 1000C with a coordinate signal I-SS having the coordinate information. For example, the coordinate information may indicate a location touched by a user. The main driver 1000C executes an operation corresponding to a user input based on the coordinate signal I-SS. For example, the main driver 1000C may operate the display driver 100C such that a new application image is displayed on the display layer 100.

Figure 4:
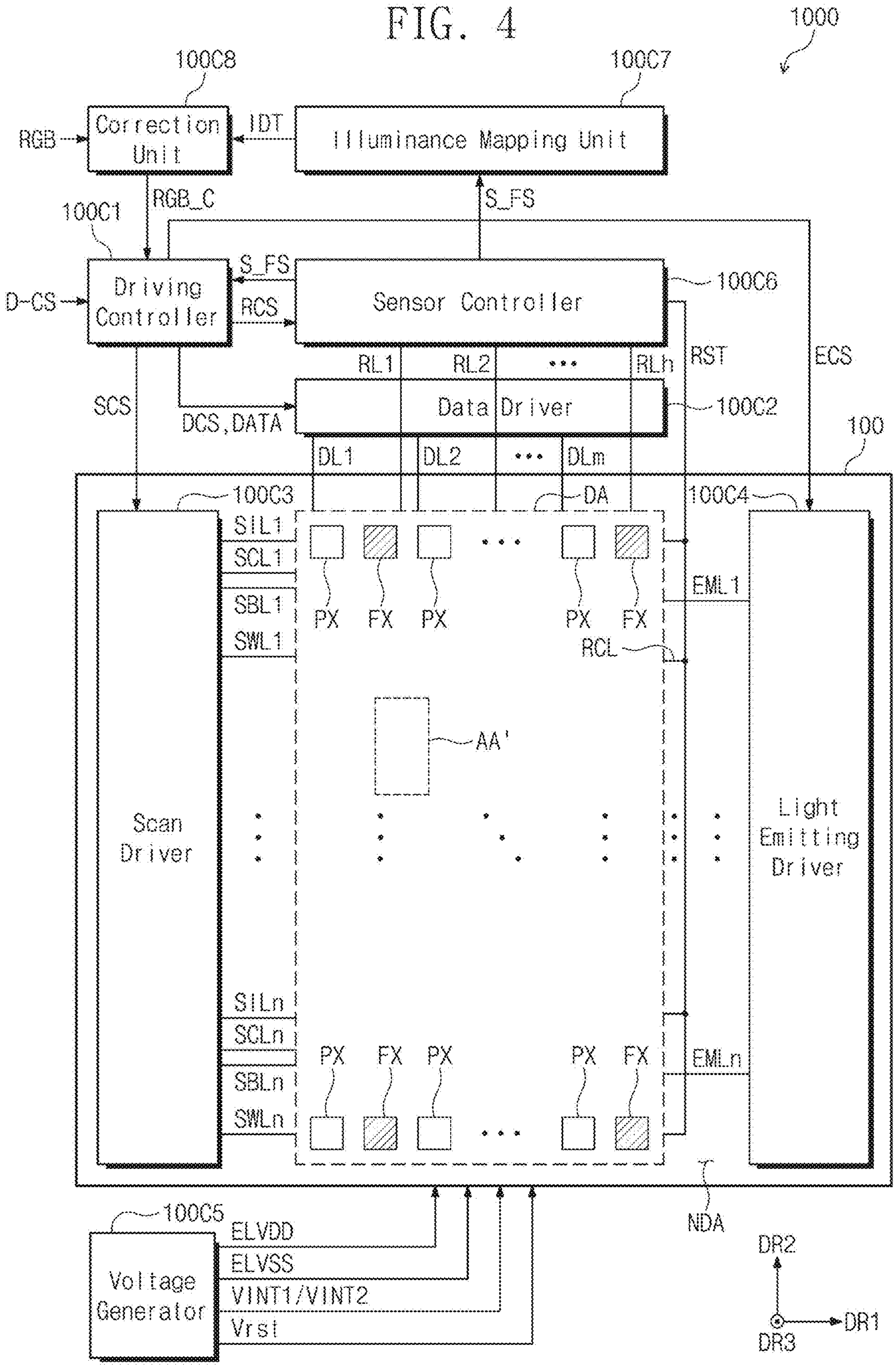
FIG. 4 is a block diagram of a display layer and a display driver, according to an embodiment of the present disclosure.

FIG. 4 is a block diagram of the display layer 100 and the display driver 100C (see FIG. 3), according to an embodiment of the present disclosure.

Referring to FIGS. 3 and 4, the display driver 100C may include a driving controller 100C1 (e.g., first control circuit), a data driver 100C2 (e.g., a first driver circuit), a scan driver 100C3 (e.g., a second driver circuit), a light emitting driver 100C4 (e.g., a third driver circuit), a voltage generator 100C5, a sensor controller 100C6 (e.g., first control circuit), an illuminance mapping unit 100C7 (e.g., a first logic circuit), and a correction unit 100C8 (e.g., a second logic circuit). The correction unit 100C8 may be referred to as a "gamma correction unit" or a "compensator".

In an embodiment of the present disclosure, the data driver 100C2, the scan driver 100C3, the light emitting driver 100C4, the voltage generator 100C5, and the sensor controller 100C6 may be referred to as a "panel driver". For example, the panel driver may include the data driver 100C2, the scan driver 100C3, the light emitting driver 100C4, the voltage generator 100C5, and the sensor controller 100C6. The panel driver may control an operation of the display panel DP. The driving controller 100C1 may control an operation of the panel driver.

In an embodiment of the present disclosure, the scan driver 100C3 and the light emitting driver 100C4 may be mounted on the display panel DP, for example, the display layer 100. The driving controller 100C1, the data driver 100C2, the voltage generator 100C5, the sensor controller 100C6, the illuminance mapping unit 100C7, and the correction unit 100C8 may be included in a plurality of integrated circuit (IC) chips, respectively. However, embodiments of the disclosure are not limited thereto. For example, the illuminance mapping unit 100C7 and the correction unit

100C8 may be implemented in one chip, or the driving controller 100C1, the illuminance mapping unit 100C7, and the correction unit 100C8 may be implemented in one chip. In another example, the illuminance mapping unit 100C7 and the correction unit 100C8 may be included in the same chip as the main driver 1000C.

The display panel DP may include the display layer 100. The display layer 100 may include the display area DA for displaying an image and a peripheral area NDA (or a non-display area) adjacent to the display area DA.

The display layer 100 may include the plurality of pixels PX disposed in a display area DA and a plurality of sensors FX disposed in the display area DA. The data driver 100C2, the scan driver 100C3, and the light emitting driver 100C4 may control operations of a plurality of pixels PX. The scan driver 100C3 and the sensor controller 100C6 may control operations of the plurality of sensors FX.

The display layer 100 further includes initialization scan lines SIL1 to SILn, compensation scan lines SCL1 to SCLn, write scan lines SWL1 to SWLn, black scan lines SBL1 to SBLn, emission control lines EML1 to EMLn, data lines DL1 to DLm, and readout lines RL1 to RLh.

The initialization scan lines SIL1 to SILn, the compensation scan lines SCL1 to SCLn, the write scan lines SWL1 to SWLn, the black scan lines SBL1 to SBLn, and the emission control lines EML1 to EMLn extend in the first direction DR1. The initialization scan lines SIL1 to SILn, the compensation scan lines SCL1 to SCLn, the write scan lines SWL1 to SWLn, the black scan lines SBL1 to SBLn, and the emission control lines EML1 to EMLn are arranged spaced from one another in the second direction DR2. The data lines DL1 to DLm and the readout lines RL1 to RLh extend in the second direction DR2 and are arranged spaced from each other in the first direction DR1.

The plurality of pixels PX are electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm. For example, each of the plurality of pixels PX may be electrically connected to four scan lines. However, the number of scan lines connected to each of the pixels PX is not limited thereto, and may be changed.

The plurality of sensors FX are electrically connected to the readout lines RL1 to RLh. One of the sensors FX may be electrically connected to one scan line, for example, one write scan line among the write scan lines SWL1 to SWLn. However, the present disclosure is not limited thereto. The number of scan lines connected to each of the sensors FX may be changed.

In an embodiment of the present disclosure, the number of readout lines RL1 to RLh may correspond to ½ of the number of data lines DL1 to DLm. However, the present disclosure is not limited thereto. For example, the number of readout lines RL1 to RLh may correspond to ¼ or ⅛ of the number of data lines DL1 to DLm, or may be the same as the number of data lines DL1 to DLm.

The driving controller 100C1 receives correction image data RGB_C and the control signal D-CS. The correction image data RGB_C may be data obtained by correcting image data RGB corresponding to the plurality of pixels PX.

The driving controller 100C1 generates an image data signal DATA by converting the data format of the correction image data RGB_C to be suitable for the interface specifications of the data driver 100C2. The driving controller 100C1 outputs a first controller signal SCS, a second controller signal ECS, a third controller signal DCS, and a fourth controller signal RCS.

The data driver 100C2 receives the third control signal DCS and the image data signal DATA from the driving controller 100C1. The data driver 100C2 converts the image data signal DATA into data signals and outputs the data signals to the plurality of data lines DL1 to DLm to be described later. The data signals refer to analog voltages corresponding to grayscale values of the image data signal DATA.

The scan driver 100C3 receives the first control signal SCS from the driving controller 100C1. The scan driver 100C3 may output scan signals to scan lines in response to the first control signal SCS. For example, in response to the first control signal SCS, the scan driver 100C3 outputs initialization scan signals to the initialization scan lines SIL1 to SILn and outputs compensation scan signals to the compensation scan lines SCL1 to SCLn. Further, in response to the first control signal SCS, the scan driver 100C3 may output write scan signals to the write scan lines SWL1 to SWLn and may output black scan signals to the black scan lines SBL1 to SBLn.

The light emitting driver 100C4 receives the second control signal ECS from the driving controller 100C1. The light emitting driver 100C4 may output emission control signals to the emission control lines EML1 to EMLn in response to the second control signal ECS. In an embodiment, the scan driver 100C3 is additionally connected to the emission control lines EML1 to EMLn. In this embodiment, the light emitting driver 100C4 may be omitted, and the scan driver 100C3 may output the emission control signals to the emission control lines EML1 to EMLn.

The scan driver 100C3 and the light emitting driver 100C4 may be disposed in the peripheral area NDA of the display layer 100. However, embodiments of the disclosure are not limited thereto. For example, at least part of each of the scan driver 100C3 and the light emitting driver 100C4 may be disposed in the display area DA.

The voltage generator 100C5 generates voltages for the operation of the display layer 100. In an embodiment, the voltage generator 100C5 generates a first driving voltage ELVDD, a second driving voltage ELVSS, a first initialization voltage VINT1, a second initialization voltage VINT2, and a reset voltage Vrst.

The sensor controller 100C6 receives the fourth control signal RCS from the driving controller 100C1.

In response to the fourth control signal RCS, the sensor controller 100C6 may receive sensing signals from the readout lines RL1 to RLh. The sensor controller 100C6 may process sensing signals received from the readout lines RL1 to RLh to generate processed sensing signals S_FS and provide the processed sensing signals S_FS to the driving controller 100C1 and the illuminance mapping unit 100C7.

Each of the plurality of sensors FX may receive light during a predetermined light receiving period. In an embodiment of the present disclosure, the plurality of sensors FX sense external illuminance. In an embodiment of the present disclosure, the plurality of sensors FX are used to sense a fingerprint as well as an external illuminance. The plurality of sensors FX may be distributed and positioned within the display area DA. Accordingly, when illuminance is sensed by using the plurality of sensors FX, illuminance having a wider range may be sensed compared to a case where an illuminance sensor is placed in a specific area.

The illuminance mapping unit 100C7 receives the sensing signals S_FS including information about a plurality of illuminance values sensed by the plurality of sensors FX. The illuminance mapping unit 100C7 may generate illuminance mapping data IDT obtained by mapping a plurality of illuminance values. The illuminance mapping unit 100C7 may output the illuminance mapping data IDT to the correction unit 100C8.

The correction unit 100C8 may generate the correction image data RGB_C by correcting the image data RGB based on the illuminance mapping data IDT. For example, the correction unit 100C8 may generate the correction image data RGB_C obtained by performing a gamma-correction on the image data RGB based on the illuminance mapping data IDT. The correction unit 100C8 may output the correction image data RGB_C to the driving controller 100C1.

The correction unit 100C8 may be configured to determine a correction weight based on the illuminance mapping data IDT. For example, even when the same grayscale (or referred to as a "grayscale") is input, the correction weight may vary depending on the detected illuminance value. For example, even when the same image data RGB is input, the correction unit 100C8 may process an image to be displayed in an outdoor light exposure area as a gamma value for generating a brighter luminance. The correction unit 100C8 may include a lookup table in which a correction weight corresponding to a sensed illuminance value is stored, but is not limited thereto.

In an embodiment, the correction weight is an offset to be added to the image data. For example, if a pixel is in an area having an illuminance value higher than a certain threshold, the offset may be a positive non-zero value that can be added to image data for the pixel to increase its displayed intensity. In an embodiment, the offset is proportional to the illuminance value. For example, if the pixel is in an area having an illuminance value equal to or less than the certain threshold, the offset may be zero. In an embodiment, the luminance of the actual displayed image may be adjusted by multiplying the grayscale of the image data RGB by the correction weight. In this case, if the correction weight is 1, the luminance of the image corresponding to the grayscale may be the reference luminance. If the correction weight is greater than 1, the luminance of the actual displayed image is brighter than the reference luminance. In an embodiment, the luminance of the actual displayed image may be adjusted by adding a correction weight to the grayscale of the image data RGB. In this case, if the correction weight is 0, the luminance of the image corresponding to the grayscale may be the reference luminance. If the correction weight is greater than 0, the luminance of the actual displayed image is brighter than the reference luminance.

In an embodiment of the present disclosure, the correction unit 100C8 is configured to determine a correction weight for each of the plurality of pixels PX and to generate the correction image data RGB_C obtained by correcting the image data RGB based on the correction weights. In this case, a gamma correction for each of the plurality of pixels PX may be applied. Accordingly, a contrast ratio for each of the plurality of pixels PX with respect to external light may be corrected. The display area DA may be divided into a plurality of areas (or referred to as a "plurality of blocks"). For example, the display area DA may be divided into a plurality of areas arranged in the first direction DR1 or the second direction DR2 or a plurality of areas arranged in the first direction DR1 and the second direction DR2. In an embodiment of the present disclosure, the correction unit 100C8 may be configured to determine a correction weight for each of the plurality of areas and to generate the correction image data RGB_C obtained by correcting the image data RGB based on the correction weight.

Figure 5:
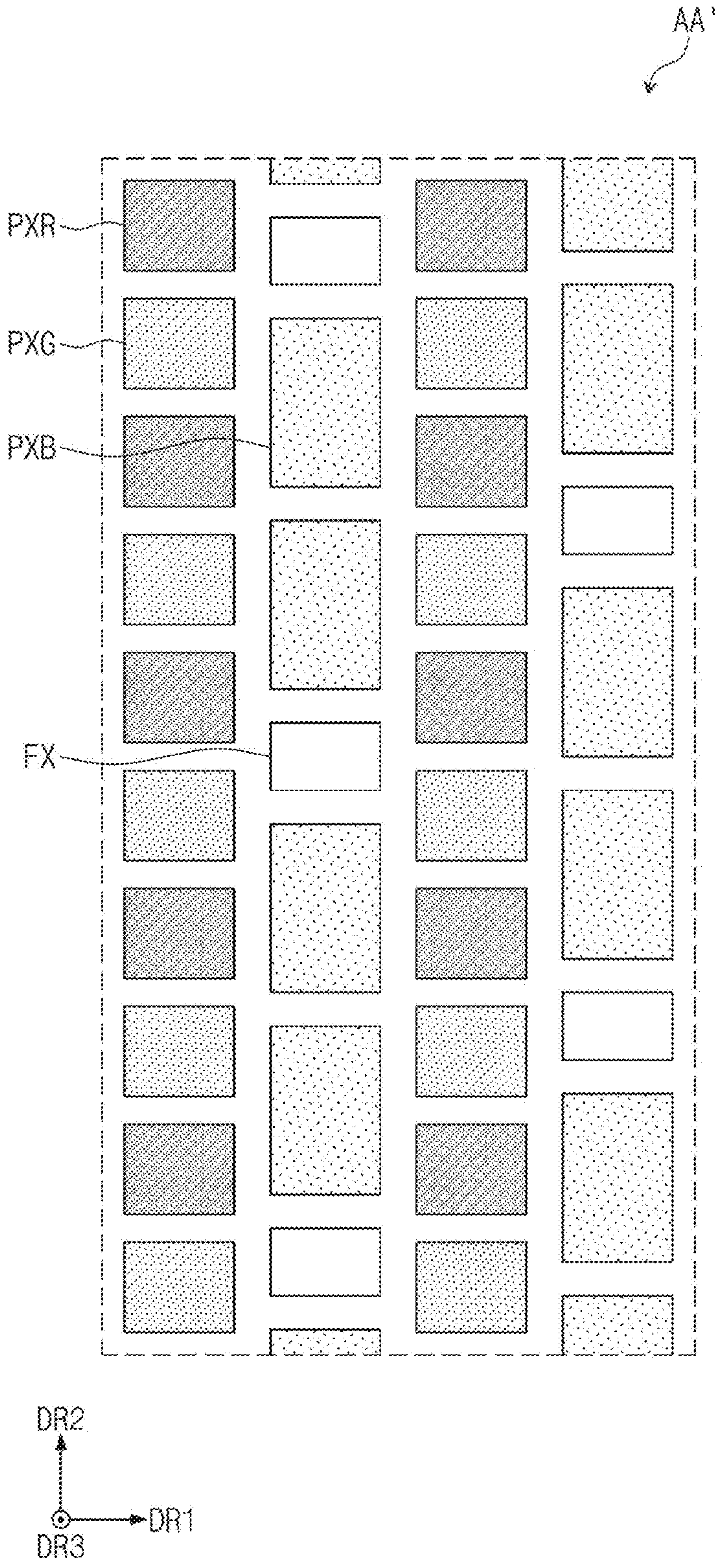
FIG. 5 is an enlarged plan view of a portion of a display layer, according to an embodiment of the present disclosure.

FIG. 5 is an enlarged plan view of a portion of a display layer, according to an embodiment of the present disclosure. FIG. 5 may be an enlarged plan view of area AA' shown in FIG. 4.

Referring to FIGS. 4 and 5, the plurality of pixels PX may include a first pixel PXR, a second pixel PXG, and a third pixel PXB. The first pixel PXR may be a red pixel, the second pixel PXG may be a green pixel, and the third pixel PXB may be a blue pixel, but is not limited thereto.

The first pixel PXR and the second pixel PXG may be alternately and repeatedly arranged one by one in the second direction DR2. The two third pixels PXB and the one sensor FX may be alternately and repeatedly arranged in the second direction DR2. The arrangement pattern of the plurality of pixels PX and the plurality of sensors FX shown in FIG. 5 is an example, and embodiments of the disclosure are not limited thereto.

In an embodiment of the present disclosure, the number of pixels PX is greater than the number of sensors FX. In this case, the illuminance mapping unit 100C7 may generate the illuminance mapping data IDT corresponding to the resolution of the display layer 100 based on the illuminance values measured by the plurality of sensors FX. For example, when mapping data having relatively small size is obtained, the illuminance mapping unit 100C7 may generate the illuminance mapping data IDT by resizing the mapping data by using a predetermined algorithm.

Figure 6:
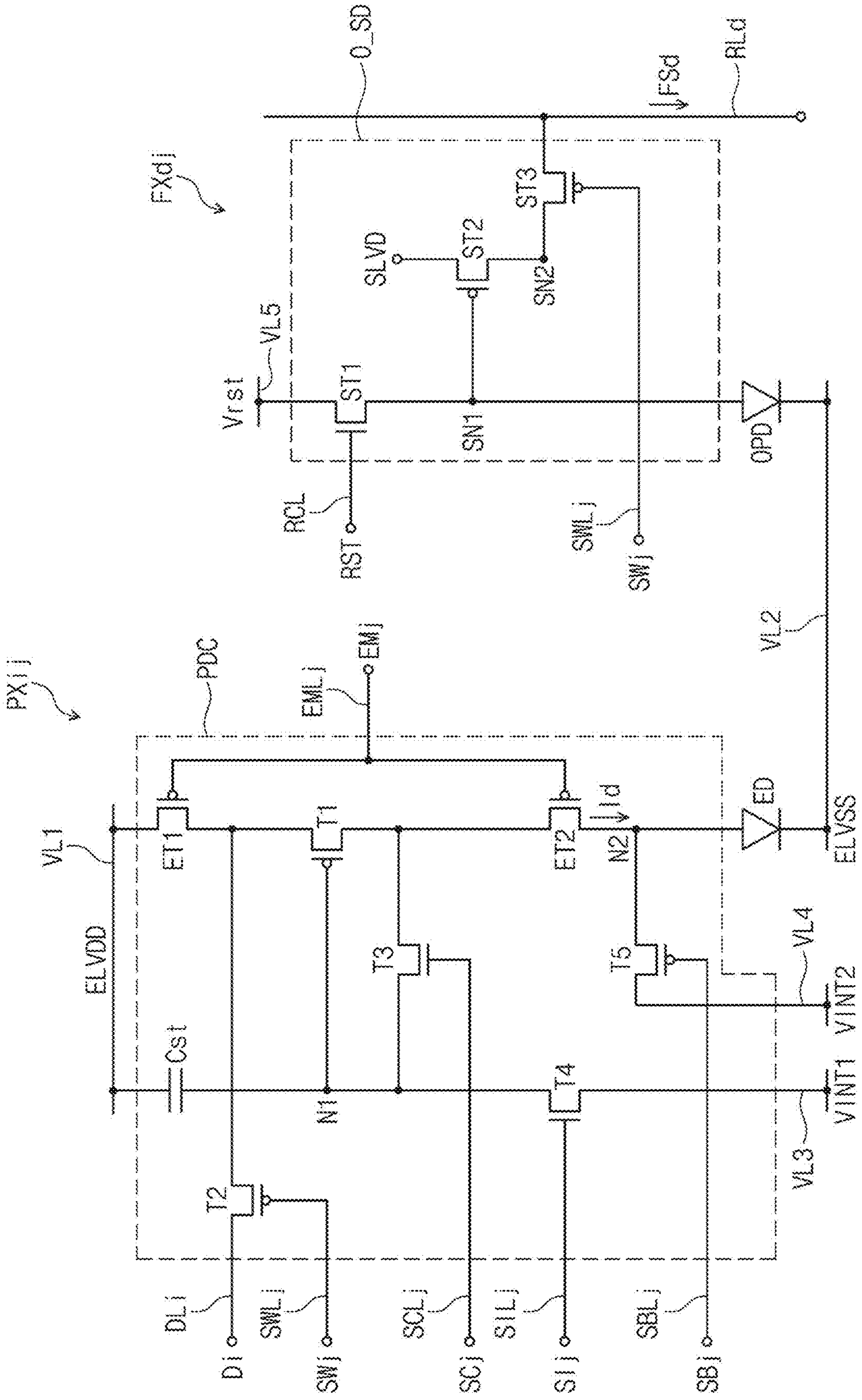
FIG. 6 is an equivalent circuit diagram of a pixel and a sensor, according to an embodiment of the present disclosure.

FIG. 6 is an equivalent circuit diagram of a pixel PXij and a sensor FXdj, according to an embodiment of the present disclosure.

FIG. 6 shows an equivalent circuit diagram of one pixel PXij among the plurality of pixels PX (see FIG. 4). Because each of the plurality of pixels PX has the same circuit structure, a detailed description of the remaining pixels PX may be replaced with a description of a circuit structure of the pixel PXij. Moreover, FIG. 6 shows an equivalent circuit diagram of one sensor FXdj among the plurality of sensors FX shown in FIG. 4. Because each of the plurality of sensors FX has the same circuit structure, the detailed description of the remaining sensors FX may be replaced with a description of a circuit structure for the sensor FXdj.

Referring to FIGS. 4 and 6, the pixel PXij is connected to the i-th data line DLi of the data lines DL1 to DLm, the j-th initialization scan line SILj of the initialization scan lines SIL1 to SILn, the j-th compensation scan line SCLj of the compensation scan lines SCL1 to SCLn, the j-th write scan line SWLj of the write scan lines SWL1 to SWLn, the j-th black scan line SBLj of the black scan lines SBL1 to SBLn, and the j-th emission control line EMLj of the emission control lines EML1 to EMLn.

The pixel PXij includes a light emitting element ED and a pixel driving circuit PDC. The light emitting element ED may be a light emitting diode. As an example of the present disclosure, the light emitting element ED may be an organic light emitting diode including an organic light emitting layer, but is not limited thereto.

The pixel driving circuit PDC includes first to fifth transistors T1, T2, T3, T4, and T5, first and second emission control transistors ET1 and ET2, and one capacitor Cst.

At least one of the first to fifth transistors T1, T2, T3, T4, and T5 and the first and second emission control transistors ET1 and ET2 may be a transistor having a low-temperature polycrystalline silicon (LTPS) semiconductor layer. At least one of the first to fifth transistors T1, T2, T3, T4, and T5 and the first and second emission control transistors ET1 and ET2 may be a transistor having an oxide semiconductor layer. For example, the third and fourth transistors T3 and T4 may be oxide semiconductor transistors, and the first, second, and fifth transistors T1, T2, and T5 and the first and second emission control transistors ET1 and ET2 may be LTPS transistors.

In an embodiment, the transistor T1 directly exerting an influence on the brightness of the display device 1000 (see FIG. 1) is configured to include a semiconductor layer including a polycrystalline silicon having high reliability, thereby implementing a higher-resolution display device. However, because the oxide semiconductor has high carrier mobility and low leakage current, the voltage drop is not significant even though the driving time is long. In other words, even when the display device operates at a low frequency, the color of an image is not significantly changed due to the voltage drop, and thus the display device may operate at the low frequency. As such, the oxide semiconductor has a weak leakage current. Accordingly, the leakage current is prevented from flowing into a gate electrode while power consumption is reduced, by employing at least one of the third transistor T3 and the fourth transistor T4, which are connected to the third electrode (or gate electrode) of the first transistor T1, as an oxide semiconductor.

Some of the first to fifth transistors T1, T2, T3, T4, and T5 and the first and second emission control transistors ET1 and ET2 may be P-type transistors, and the others thereof may be N-type transistors. For example, the first, second, and fifth transistors T1, T2, and T5 and the first and second emission control transistors ET1 and ET2 are P-type transistors, and the third and fourth transistors T3 and T4 may be N-type transistors.

A configuration of the pixel driving circuit PDC according to the present disclosure is not limited to the embodiment illustrated in FIG. 6. For example, the configuration of the pixel driving circuit PDC may be variously modified and implemented. Each of the first to fifth transistors T1, T2, T3, T4, and T5 and the first and second emission control transistors ET1 and ET2 may be a P-type transistor or an N-type transistor.

The j-th initialization scan line SILj, the j-th compensation scan line SCLj, the j-th write scan line SWLj, the j-th black scan line SBLj, and the j-th emission control line EMLj may transfer a j-th initialization scan signal SIj, a j-th compensation scan signal SCj, a j-th write scan signal SWj, a j-th black scan signal SBj, and a j-th emission control signal EMj to the pixel PXij, respectively. The i-th data line DLi transfers an i-th data signal Di to the pixel PXij. The i-th data signal Di may have a voltage level corresponding to the image data RGB (see FIG. 3) input to the display device 1000 (see FIG. 1).

First and second driving voltage lines VL1 and VL2 may deliver the first and second driving voltages ELVDD and ELVSS to the pixel PXij, respectively. Furthermore, first and second initialization voltage lines VL3 and VL4 may transfer the first and second initialization voltages VINT1 and VINT2 to the pixel PXij, respectively.

The first transistor T1 is connected between the first driving voltage line VL1 receiving the first driving voltage ELVDD and the light emitting element ED. The first transistor T1 includes a first electrode connected to the first driving voltage line VL1 via the first emission control transistor ET1, a second electrode connected to the light emitting element ED via the second emission control transistor ET2, and a third electrode (e.g., a gate electrode) connected to one end (e.g., a first node N1) of the capacitor Cst. The first transistor T1 may receive the data signal Di transferred through the i-th data line DLi depending on a switching operation of the second transistor T2 and then may supply a driving current Id to the light emitting element ED.

The second transistor T2 is connected between the i-th data line DLi and the first electrode of the first transistor T1. The second transistor T2 includes a first electrode connected with the i-th data line DLi, a second electrode connected with the first electrode of the first transistor T1, and a third electrode (e.g., a gate electrode) connected with the j-th write scan line SWLj. The second transistor T2 may be turned on in response to the write scan signal SWj transferred through the j-th write scan line SWLj and then may transfer the i-th data signal Di transferred from the i-th data line DLi to the first electrode of the first transistor T1. For example, the write scan signal SWj may be applied to the gate electrode of the second transistor T2.

The third transistor T3 is connected between the second electrode of the first transistor T1 and the first node N1. The third transistor T3 includes a first electrode connected with the third electrode of the first transistor T1, a second electrode connected with the second electrode of the first transistor T1, and a third electrode (e.g., a gate electrode) connected with the j-th compensation scan line SCLj. The third transistor T3 may be turned on in response to the j-th compensation scan signal SCj transferred through the j-th compensation scan line SCLj and may connect the third electrode and the second electrode of the first transistor T1. In this case, the first transistor T1 may be diode-connected. For example, the j-th compensation scan signal SCj may be applied to the gate electrode of the third transistor T3.

The fourth transistor T4 is connected between the first node N1 and the first initialization voltage line VL3 through which the first initialization voltage VINT1 is applied. The fourth transistor T4 includes a first electrode connected to the first initialization voltage line VL3 through which the first initialization voltage VINT1 is supplied, a second electrode connected to the first node N1, and a third electrode (e.g., a gate electrode) connected to the j-th initialization scan line SILj. The fourth transistor T4 is turned on in response to the j-th initialization scan signal SIj transferred through the j-th initialization scan line SILj. For example, the j j-th initialization scan signal SIj may be applied to the gate electrode of the fourth transistor T4. The fourth transistor T4 thus turned on may transfer the first initialization voltage VINT1 to the first node N1 such that a potential of the third electrode of the first transistor T1 (i.e., a potential of the first node N1) is initialized.

The first emission control transistor ET1 includes a first electrode connected with the first driving voltage line VL1, a second electrode connected with the first electrode of the first transistor T1, and a third electrode (e.g., a gate electrode) connected with the j-th emission control line EMLj.

The second emission control transistor ET2 includes a first electrode connected to the second electrode of the first transistor T1, a second electrode connected to the light emitting element ED, and a third electrode (e.g., a gate electrode) connected to j-th emission control line EMLj.

In an embodiment, the first and second emission control transistors ET1 and ET2 are simultaneously turned on in response to the j-th emission control signal EMj transferred through the j-th emission control line EMLj. For example, the j-th emission control signal EMj may be applied to gate electrodes of the first and second emission control transistors ET1 and ET2. The first driving voltage ELVDD applied through the first emission control transistor ET1 thus turned on may be compensated through the diode-connected transistor T1 and then may be transferred to the light emitting diode ED.

The fifth transistor T5 includes a first electrode connected to the second initialization voltage line VL4 through which the second initialization voltage VINT2 is supplied, a second electrode connected to the second node N2, and a third electrode (e.g., gate electrode) connected to the j-th black scan line SBLj. A voltage level of the second initialization voltage VINT2 may lower than or equal to that of the first initialization voltage VINT1.

As described above, one end of the capacitor Cst is connected with the third electrode of the first transistor T1, and the other end of the capacitor Cst is connected with the first driving voltage line VL1. A cathode of the light emitting element ED may be connected with the second driving voltage line VL2 that transfers the second driving voltage ELVSS. In an embodiment, a voltage level of the second driving voltage ELVSS is lower than a voltage level of the first driving voltage ELVDD.

The sensor FX is connected to the d-th readout line RLd among the readout lines RL1 to RLh, the j-th write scan line SWLj (or referred to as an "output control line"), and a reset control line RCL.

The sensor FX includes the light sensing element OPD (or referred to as a "sensing element") and a sensor driving circuit O_SD.

The light sensing element OPD may be a photodiode. As an example of the present disclosure, the light sensing element OPD may be an organic photodiode including an organic material as a photoelectric conversion layer. A first electrode AE-S (see FIG. 7) of the light sensing element OPD may be connected to a first sensing node SN1. A second electrode CE (see FIG. 7) of the light sensing element OPD may be connected to a second driving voltage line VL2 delivering the second driving voltage ELVSS. In FIG. 6, the sensor FX includes one light sensing element OPD as an example, but is not limited thereto. For example, the sensor FX may include 'z' light sensing elements connected in parallel with each other, where 'z' may be an integer of 2 or more.

The sensor driving circuit O_SD includes three transistors ST1, ST2, and ST3. The three transistors ST1, ST2, and ST3 may include the reset transistor ST1, the amplification transistor ST2, and the output transistor ST3. At least one of the reset transistor ST1, the amplification transistor ST2, and the output transistor ST3 may be an oxide semiconductor transistor. As an example of the present disclosure, the reset transistor ST1 may be an oxide semiconductor transistor, and the amplification transistor ST2 and the output transistor ST3 may be LTPS transistors. However, the present disclosure is not limited thereto. The reset transistor ST1 and the output transistor ST3 may be oxide semiconductor transistors, and the amplification transistor ST2 may be an LTPS transistor.

Also, some of the reset transistor ST1, the amplification transistor ST2, and the output transistor ST3 may be P-type transistors, and the other(s) thereof may be an N-type transistor. As an example of the present disclosure, the amplification transistor ST2 and the output transistor ST3 may be P-type transistors, and the reset transistor ST1 may be an N-type transistor. However, the present disclosure is not limited thereto. For example, all of the reset transistor ST1, the amplification transistor ST2, and the output transistor ST3 may be N-type transistors or P-type transistors.

The circuit configuration of the sensor driving circuit O_SD according to the present disclosure is not limited to that illustrated in FIG. 6. The configuration of the sensor driving circuit O_SD may be variously modified and implemented.

The reset transistor ST1 includes a first electrode that is connected to the third initialization voltage line VL5 to receive the reset voltage Vrst, a second electrode connected with the first sensing node SN1, and a third electrode receiving a reset control signal RST. The reset transistor ST1 may reset a potential of the first sensing node SN1 to the reset voltage Vrst in response to the reset control signal RST. The reset control signal RST may be a signal provided through the reset control line RCL.

The amplification transistor ST2 includes a first electrode receiving a sensing driving voltage SLVD, a second electrode connected with the second sensing node SN2, and a third electrode connected with the first sensing node SN1. The amplification transistor ST2 is turned on in response to the potential of the first sensing node SN1 to apply the sensing driving voltage SLVD to the second sensing node SN2. As an example of the present disclosure, the sensing driving voltage SLVD may correspond to one of the first driving voltage ELVDD, the first initialization voltage VINT1, and the second initialization voltage VINT2. When the sensing driving voltage SLVD corresponds to the first driving voltage ELVDD, the first electrode of the amplification transistor ST2 may be electrically connected with the first driving voltage line VL1. When the sensing driving voltage SLVD corresponds to the first initialization voltage VINT1, the first electrode of the amplification transistor ST2 may be electrically connected with the first initialization voltage line VL3. When the sensing driving voltage SLVD corresponds to the second initialization voltage VINT2, the first electrode of the amplification transistor ST2 may be electrically connected with the second initialization voltage line VL4.

The output transistor ST3 includes a first electrode connected to the second sensing node SN2, a second electrode connected to the d-th readout line RLd, and a third electrode for receiving an output control signal. The output transistor ST3 may deliver a sensing signal FSd to the readout line RLd in response to an output control signal. The output control signal may be a j-th write scan signal SWj (or referred to as a "j-th output control signal") supplied through the j-th write scan line SWLj. That is, the output transistor ST3 may receive the j-th write scan signal SWj supplied from the j-th write scan line SWLj as the output control signal. For example, the j-th write scan signal SWj may be applied to a gate terminal of the output transistor ST3.

The reset period may be defined as an activation period (i.e., a high-level period) of the reset control line RCL. When the reset control signal RST of a high level is supplied through the reset control line RCL, the reset transistor ST1 is turned on. When the reset transistor ST1 is a PMOS transistor, the reset control signal RST of a low level may be supplied to the reset control line RCL during the reset period. During the reset period, a potential of the first sensing node SN1 may be reset to a potential corresponding to the reset voltage Vrst. As an example of the present disclosure, the reset voltage Vrst may have a lower voltage level than the second driving voltage ELVSS.

During illuminance sensing, the light sensing element OPD of the sensor FX may be exposed to external light. During fingerprint sensing, the light sensing element OPD of the sensor FX may be exposed to light during the light emitting period of the light emitting element ED.

The voltage of the first sensing node SN1 may maintain the reset voltage Vrst in the reset period, and then the voltage of the first sensing node SN1 may gradually shift to the second driving voltage ELVSS as the light sensing element OPD is exposed to light. The amplification transistor ST2 may be a source follower amplifier generating a source-drain current in proportion to the charge amount of the first sensing node SN1 input to the third electrode of the amplification transistor ST2.

During an output period, the j-th write scan signal SWj of a low level is supplied to the output transistor ST3 through the j-th write scan line SWLj. When the output transistor ST3 is turned on in response to the j-th write scan signal SWj of the low level, the sensing signal FSd corresponding to a current flowing through the amplification transistor ST2 may be output to the d-th readout line RLd.

Figure 7:
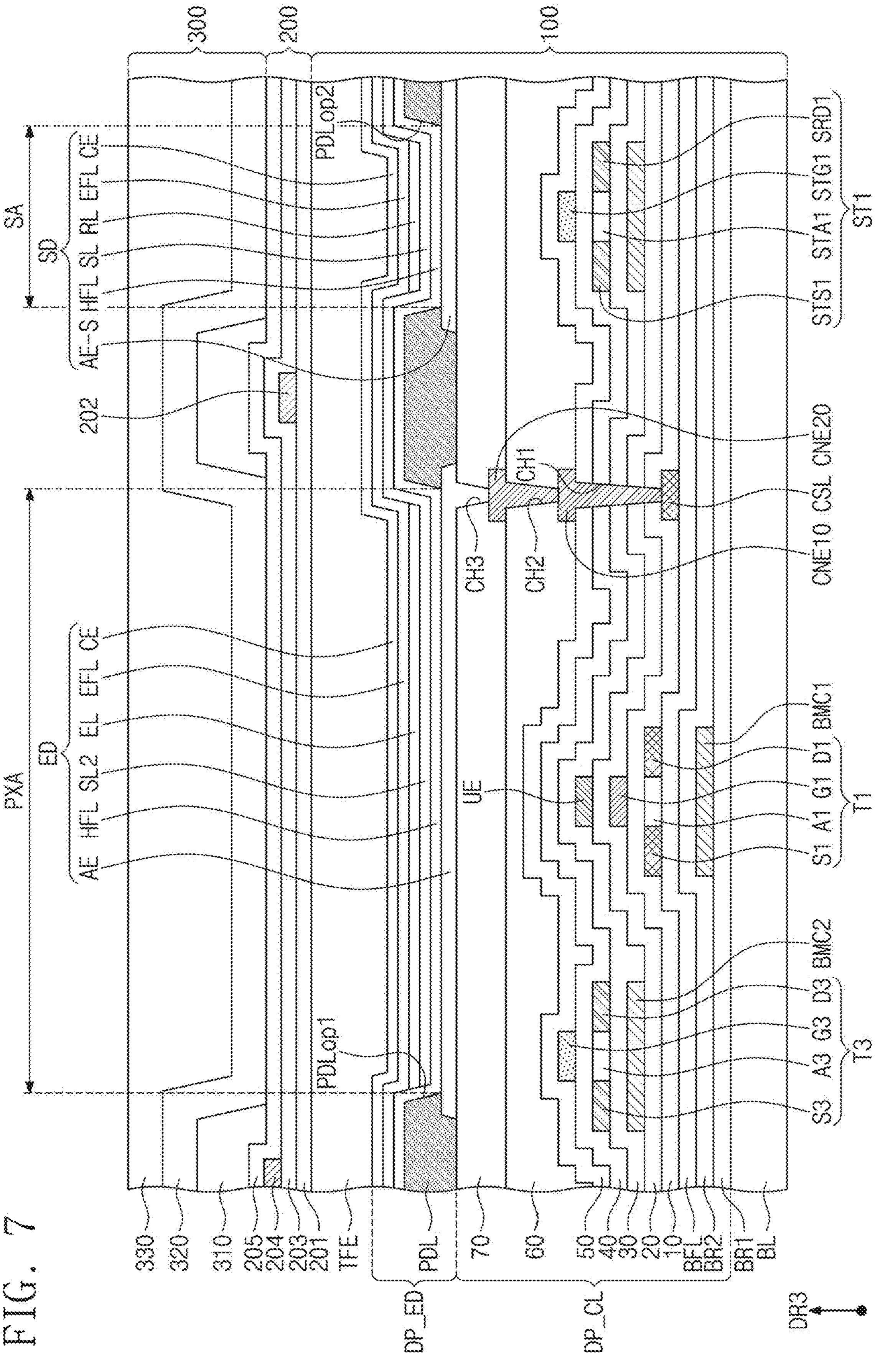
FIG. 7 is a cross-sectional view of a display device, according to an embodiment of the present disclosure.

FIG. 7 is a cross-sectional view of a display device, according to an embodiment of the present disclosure.

Referring to FIG. 7, the display layer 100 may include the base layer BL, the circuit layer DP_CL disposed on the base layer BL, the element layer DP_ED, and the encapsulation layer TFE.

At least one inorganic layer is formed on an upper surface of the base layer BL. The inorganic layer may include at least one of aluminum oxide, titanium oxide, silicon oxide, silicon oxynitride, zirconium oxide, and hafnium oxide. The inorganic layer may be formed of multiple layers. The multi-layered inorganic layers may constitute barrier layers BR1 and BR2 and/or a buffer layer BFL. The barrier layers BR1 and BR2 and the buffer layer BFL may be disposed selectively.

The barrier layers BR1 and BR2 prevent foreign objects from being introduced from the outside. The barrier layers BR1 and BR2 may include a silicon oxide layer and a silicon nitride layer. Each of the silicon oxide layer and the silicon nitride layer may include a plurality of layers, and the silicon oxide layers and the silicon nitride layers may be alternately stacked.

The barrier layers BR1 and BR2 may include the first barrier layer BR1 and the second barrier layer BR2. A first back metal layer BMC1 may be interposed between the first barrier layer BR1 and the second barrier layer BR2. In an embodiment of the present disclosure, the first back metal layer BMC1 is omitted.

The buffer layer BFL may be disposed on the barrier layers BR1 and BR2. The buffer layer BFL increases a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A first semiconductor pattern may be disposed on the buffer layer BFL. The first semiconductor pattern may include a silicon semiconductor. For example, the silicon semiconductor may include amorphous silicon or polycrystalline silicon. For example, the first semiconductor pattern may include low-temperature polysilicon.

FIG. 7 illustrates only a portion of the first semiconductor pattern disposed on the buffer layer BFL. Another portion of the first semiconductor pattern may be further disposed in another area. The first semiconductor pattern may be arranged across pixels according to a specific rule. The first semiconductor pattern may have electrical characteristics different depending on whether the first semiconductor pattern is doped. The first semiconductor pattern may include a first area having high conductivity and a second area having low conductivity. The first area may be doped with an N-type dopant or a P-type dopant. A P-type transistor may include an area doped with the P-type dopant, and an N-type transistor may include an area doped with the N-type dopant. The second area may be an undoped area or an area doped with a concentration lower than a concentration in the first area.

In an embodiment, the conductivity of the first area is greater than the conductivity of the second area. The first area may substantially serve as an electrode or a signal line. The second area may substantially correspond to an active area (or a channel) of a transistor. In other words, a part of the semiconductor pattern may be an active area of the transistor. Another part thereof may be a source or drain of the transistor. Another part thereof may be a connection electrode or a connection signal line.

A first electrode S1, an active area A1, and a second electrode D1 of the first transistor T1 are formed from the first semiconductor pattern. The first electrode S1 and the second electrode D1 of the first transistor T1 extend in opposite directions from the active area A1.

A portion of a connection signal line CSL formed from the first semiconductor pattern is illustrated in FIG. 7. The connection signal line CSL may be electrically connected to the second electrode of the fifth transistor T5 (see FIG. 6) and the second emission control transistor ET2.

A first insulating layer 10 may be disposed on the buffer layer BFL. The first insulating layer 10 may overlap a plurality of pixels in common and may cover the first semiconductor pattern. The first insulating layer 10 may be an inorganic layer and/or an organic layer, and may have a single layer or multi-layer structure. The first insulating layer 10 may include at least one of an aluminum oxide, a titanium oxide, a silicon oxide, silicon nitride, a silicon oxynitride, a zirconium oxide, and a hafnium oxide. In an embodiment, the first insulating layer 10 is a silicon oxide layer having a single layer structure. An insulating layer of the circuit layer DP_CL, as well as the first insulating layer 10 may be an inorganic layer and/or an organic layer, and may have a single layer structure or a multi-layer structure. The inorganic layer may include at least one of the above-described materials, but is not limited thereto.

A third electrode G1 of the first transistor T1 is disposed on the first insulating layer 10. The third electrode G1 may be a portion of a metal pattern. The third electrode G1 of the first transistor T1 overlaps the active area A1 of the first transistor T1. In a process of doping the first semiconductor pattern, the third electrode G1 of the first transistor T1 may function as a mask. The third electrode G1 may include, but is not limited to, titanium (Ti), silver (Ag), an alloy containing silver (Ag), molybdenum (Mo), an alloy containing molybdenum (Mo), aluminum (Al), an alloy containing aluminum (Al), aluminum nitride (AlN), tungsten (W), tungsten nitride (WN), copper (Cu), indium tin oxide (ITO), indium zinc oxide (IZO), or the like.

A second insulating layer 20 may be disposed on the first insulating layer 10 and may cover the third electrode G1 of the first transistor T1. The second insulating layer 20 may be an inorganic layer and/or an organic layer, and may have a single layer structure or a multi-layer structure. The second insulating layer 20 may include at least one of silicon oxide, silicon nitride, and silicon oxynitride. In an embodiment, the second insulating layer 20 has a multi-layer structure including a silicon oxide layer and a silicon nitride layer.

An upper electrode UE and a second back metal layer BMC2 may be disposed on the second insulating layer 20. In an embodiment of the present disclosure, the second back metal layer BMC2 is omitted. The upper electrode UE may overlap the third electrode G1. The upper electrode UE may be a portion of a metal pattern. A portion of the third electrode G1 and the upper electrode UE overlapping the portion of the third electrode G1 may define the capacitor Cst (see FIG. 6). In an embodiment of the present disclosure, the second insulating layer 20 may be replaced with an insulating pattern. In this case, the upper electrode UE may be disposed on an insulating pattern, and the upper electrode UE may serve as a mask for forming an insulating pattern from the second insulating layer 20.

The second back metal layer BMC2 may be disposed to correspond to a lower portion of an oxide thin film transistor (e.g., the third transistor T3). In an embodiment, the second back metal layer BMC2 receives a constant voltage or a signal.

A third insulating layer 30 may be disposed on the second insulating layer 20 and may cover the upper electrode UE and the second back metal layer BMC2. The third insulating layer 30 may have a single layer or multi-layer structure. For example, the third insulating layer 30 may have a multi-layer structure including a silicon oxide layer and a silicon nitride layer.

A second semiconductor pattern may be disposed on the third insulating layer 30. The second semiconductor pattern may include an oxide semiconductor. The oxide semiconductor may include a plurality of areas that are distinguished from one another depending on whether metal oxide is reduced. An area (hereinafter referred to as a "reduction area") in which the metal oxide is reduced has higher conductivity than an area (hereinafter referred to as a "non-reduction area") in which the metal oxide is not reduced. The reduction area substantially serves as a source/drain area of a transistor or a signal line. The non-reduction area substantially corresponds to an active area (alternatively, a semiconductor area or a channel) of the transistor. In other words, a part of the second semiconductor pattern may be the active area of the transistor; another part thereof may be the source/drain area of the transistor; and the other part thereof may be a signal transmission area.

A first electrode S3, an active area A3, and a second electrode D3 of the third transistor T3 are formed from the second semiconductor pattern. The first electrode S3 and the second electrode D3 include a metal reduced from a metal oxide semiconductor. The first electrode S3 and the second electrode D3 may extend in directions opposite to each other from the active area A3 on a cross section.

A fourth insulating layer 40 may be disposed on the third insulating layer 30. The fourth insulating layer 40 may overlap a plurality of pixels in common and may cover the second semiconductor pattern. The fourth insulating layer 40 may include at least one of aluminum oxide, titanium oxide, silicon oxide, silicon nitride, silicon oxynitride, zirconium oxide, and hafnium oxide.

A third electrode G3 of the third transistor T3 is disposed on the fourth insulating layer 40. The third electrode G3 may be a portion of a metal pattern. The third electrode G3 of the third transistor T3 overlaps the active area A3 of the third transistor T3. The third electrode G3 may function as a mask in a process of reducing the second semiconductor pattern. In an embodiment of the present disclosure, the fourth insulating layer 40 may be replaced with an insulating pattern.

A fifth insulating layer 50 may be disposed on the fourth insulating layer 40 and may cover the third electrode G3. The fifth insulating layer 50 may be an inorganic layer.

A first connection electrode CNE10 may be disposed on the fifth insulating layer 50. The first connection electrode CNE10 may be connected to the connection signal line CSL through a first contact hole CH1 penetrating the first to fifth insulating layers 10, 20, 30, 40, and 50.

The sixth insulating layer 60 may be disposed on the fifth insulating layer 50. The sixth insulating layer 60 may be an organic layer. The organic layer may include general purpose polymers such as benzocyclobutene (BCB), polyimide, hexamethyldisiloxane (HMDSO), polymethylmethacrylate (PMMA) or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and the blend thereof, but is not limited thereto.

A second connection electrode CNE20 may be disposed on the fifth insulating layer 60. The second connection electrode CNE20 may be connected to the first connection electrode CNE10 through a second contact hole CH2 penetrating the sixth insulating layer 60. The seventh insulating layer 70 may be disposed on the sixth insulating layer 60 and may cover the second connection electrode CNE20. The seventh insulating layer 70 may be an organic layer.

The circuit layer DP_CL may further include the sensor driving circuit O_SD (see FIG. 6). For convenience of description, the reset transistor ST1 of the sensor driving circuit O_SD is shown. A first electrode STS1, an active area STA1, and a second electrode SRD1 of the reset transistor ST1 are formed from the second semiconductor pattern. The first electrode STS1 and the second electrode SRD1 include a metal reduced from a metal oxide semiconductor. The fourth insulating layer 40 is disposed to cover the first electrode STS1, the active area STA1, and the second electrode SRD1 of the reset transistor ST1. A third electrode STG1 of the reset transistor ST1 is disposed on the fourth insulating layer 40. In an embodiment, the third electrode STG1 is a part of the metal pattern. The third electrode STG1 of the reset transistor ST1 overlaps the active area STA1 of the reset transistor ST1.

In an embodiment of the present disclosure, the reset transistor ST1 is disposed on a same layer as the third transistor T3. That is, the first electrode STS1, the active area STA1, and the second electrode SRD1 of the reset transistor ST1 may be formed through a process the same as the first electrode S3, the active area A3, and the second electrode D3 of the third transistor T3. The third electrode STG1 of the reset transistor ST1 may be simultaneously formed through the same process as the third electrode G3 of the third transistor T3. The first electrode and the second electrode of each of the amplification transistor ST2 and the output transistor ST3 of the sensor driving circuit O_SD may be formed through the same process as the first electrode S1 and the second electrode D1 of the first transistor T1. The reset transistor ST1 and the third transistor T3 may be formed on the same layer through the same process. Accordingly, because an additional process of forming the reset transistor ST1 is not required, process efficiency and costs may be reduced.

The element layer DP_ED may be disposed on the circuit layer DP_CL. The element layer DP_ED may include the light emitting elements ED and the light sensing elements OPD. FIG. 7 representatively shows one light emitting element ED and one light sensing element OPD.

A light emitting area PXA may be defined to correspond to the light emitting element ED. A sensing area SA may be defined to correspond to the light sensing element OPD. Each of the light emitting area PXA and the sensing area SA may be defined by a pixel defining layer PDL.

The light emitting element ED may include a first electrode AE, a first functional layer HFL, a light emitting layer EL, a second functional layer EFL, and a second electrode CE. The light sensing element OPD may include a first electrode AE-S, a first functional layer HFL, a photoelectric conversion layer RL, a second functional layer EFL, and a second electrode CE. The first functional layer HFL, the second functional layer EFL, and the second electrode CE may be commonly provided to the pixels PX (see FIG. 4) and the sensors FX (see FIG. 4). For example, a single first layer representing the first functional layer HFL may overlap several pixels PX and several sensors FX, a single second layer representing the second functional layer EFL may overlap several pixels PX and several sensors FX, and a single third layer representing the second electrode CE may overlap several pixels PX and several sensors FX.

Referring to FIG. 7, the first electrode AE of the light emitting element ED and the first electrode AE-S of the light sensing element OPD are disposed on the seventh insulating layer 70. The first electrode AE of the light emitting element ED may be connected to the second connection electrode CNE20 through a third contact hole CH3 penetrating the seventh insulating layer 70.

The light emitting element ED may further include an auxiliary layer SL2. The auxiliary layer SL may be commonly disposed in the light emitting area PXA and the sensing area SA. The auxiliary layer SL may be interposed between the first functional layer HFL and a light emitting layer EL and between the first functional layer HFL and the photoelectric conversion layer RL. In an embodiment of the present disclosure, the auxiliary layer SL is omitted.

The pixel defining layer PDL is disposed on the seventh insulating layer 70 and may cover a portion of each of the first electrodes AE and AE-S. Openings PDLop1 and PDLop2 are provided on the pixel defining layer PDL. The plurality of light emitting areas PXA and the plurality of sensing areas SA may be defined by the openings PDLop1 and PDLop2.

The light emitting area PXA may be defined by the first opening PDLop1. The sensing area SA may be defined by the second opening PDLop2. The first opening PDLop1 may expose at least part of the first electrode AE of the light emitting element ED. The second opening PDLop2 may expose at least part of the first electrode AE-S of the light sensing element OPD.

In an embodiment of the present disclosure, the pixel defining layer PDL further includes a black material. The pixel defining layer PDL may further include a black organic dye/pigment such as carbon black, aniline black, or the like. The pixel defining layer PDL may be formed by mixing a blue organic material and a black organic material. The pixel defining layer PDL may further include a liquid-repellent organic material.

The light emitting layer EL of the light emitting element ED may be disposed in an area corresponding to the first opening PDLop1. The light emitting layer EL may generate a predetermined colored light. In an embodiment, a patterned light emitting layer EL is described. However, one light emitting layer may be commonly disposed in a plurality of emission areas. In an embodiment, the light emitting layer generates white light or blue light. Also, the light emitting layer may have a multi-layer structure referred to as "tandem".

The light emitting layer EL may include a low-molecular organic material or a high-molecular organic material as a light emitting material. However, the light emitting layer EL may include a quantum dot material as a light emitting material in another embodiment. The core of a quantum dot of the quantum dot material may be selected from a group II-VI compound, a group III-V compound, a group IV-VI compound, a group IV element, a group IV compound, and a combination thereof.

The photoelectric conversion layer RL may be disposed in an area corresponding to the second opening PDLop2. The photoelectric conversion layer RL may include an organic photo-sensing material. The second electrode CE may be disposed on the photoelectric conversion layer RL. Each of the first electrode AE-S and the second electrode CE may receive an electrical signal. The first electrode AE-S and the second electrode CE may receive different signals. Accordingly, a predetermined electric field may be formed between the first electrode AE-S and the second electrode CE. The photoelectric conversion layer RL generates an electrical signal corresponding to the light incident on a sensor. Charges generated on the photoelectric conversion layer RL changes the electric field between the first electrode AE-S and the second electrode CE. The amount of charge generated by the photoelectric conversion layer RL may vary depending on whether light is incident onto the light sensing element OPD, the amount of light incident onto the light sensing element OPD, and the intensity of light incident onto the light sensing element OPD. Accordingly, an electric field formed between the first electrode AE-S and the second electrode CE may vary. The photoelectric conversion layer RL may include a donor layer and an acceptor layer. The donor layer may receive external light to form excitons, and the excitons may be separated from an interface between the donor layer and the acceptor layer. In this case, electrons may move to the second electrode CE along the acceptor layer, and holes may move to the first electrode AE-S along the donor layer. The light sensing element OPD according to an embodiment of the present disclosure may obtain external illuminance or fingerprint information of a user through a change in the electric field between the first electrode AE-S and the second electrode CE.

The element layer DP_ED may further include a capping layer disposed on the second electrode CE. The capping layer may increase emission efficiency by the principle of constructive interference. For example, the capping layer may include a material having a refractive index of 1.6 or higher for light having a wavelength of 589 nanometer (nm). The capping layer may be an organic capping layer including organic materials, an inorganic capping layer including inorganic materials, or a composite capping layer including organic and inorganic materials. For example, the capping layer may include a carbocyclic compound, a heterocyclic compound, an amine group-containing compound, porphine derivatives, phthalocyanine derivatives, naphthalocyanine derivatives, alkali metal complexes, alkaline earth metal complexes, or any combination thereof. The carbocyclic compound, the heterocyclic compound, and the amine group-containing compound may be selectively replaced with a substituent including oxygen (O), nitrogen (N), sulfur(S), selenium (Se), silicon (Si), fluorine (F), chlorine (Cl), bromine (Br), iodine (I), or any combination thereof.

The encapsulation layer TFE is disposed on the element layer DP_ED. The encapsulation layer TFE includes at least one inorganic layer or at least one organic layer. In an embodiment of the present disclosure, the encapsulation layer TFE may include two inorganic layers and an organic layer disposed therebetween. In an embodiment of the present disclosure, a thin-film encapsulation layer may include a plurality of inorganic layers and a plurality of organic layers, which are alternately stacked.

The encapsulation inorganic layer protects the light emitting element ED and the light receiving element OPD from moisture/oxygen, and the encapsulation organic layer protects the light emitting element ED and the light receiving element OPD from foreign substances. The encapsulation inorganic layer may include a silicon nitride layer, a silicon oxynitride layer, a silicon oxide layer, a titanium oxide layer, an aluminum oxide layer, or the like, but is not limited thereto. The encapsulation organic layer may include an acryl-based organic layer, and is not limited thereto.

The display device 1000 (see FIG. 1) may further include the sensor layer 200 and an anti-reflection layer 300.

The sensor layer 200 may be disposed on the display layer 100. The sensor layer 200 may sense an external input applied from the outside. The external input may be a user input. The user input may include various types of external inputs such as a part of a user body, light, heat, a pen, or pressure. The sensor layer 200 may be referred to as a "sensor", an "input sensing layer", or an "input sensing panel". The sensor layer 200 may include a sensor base layer 201, a first sensor conductive layer 202, a sensor insulating layer 203, a second sensor conductive layer 204, and a sensor cover layer 205.

The sensor base layer 201 may be directly disposed on the display layer 100. The sensor base layer 201 may be an inorganic layer including at least one of silicon nitride, silicon oxynitride, and silicon oxide. However, the sensor base layer 201 may be an organic layer including an epoxy resin, an acrylate resin, or an imide-based resin in another embodiment. The sensor base layer 201 may have a single layer structure or may have a multi-layer structure stacked in the third direction DR3.

Each of the first sensor conductive layer 202 and the second sensor conductive layer 204 may have a single layer structure or may have a multi-layer structure stacked in the third direction DR3.

The conductive layer 204 of the single layer structure may include a metal layer or a transparent conductive layer. The metal layer may include molybdenum, silver, titanium, copper, aluminum, or an alloy thereof. The transparent conductive layer may include transparent conductive oxide such as indium tin oxide, indium zinc oxide, zinc oxide, or indium zinc tin oxide. Besides, the transparent conductive layer may include a conductive polymer such as PEDOT, a metal nano wire, graphene, and the like.

The conductive layer 204 of the multi-layer structure may include metal layers. For example, the metal layers may have a three-layer structure of titanium/aluminum/titanium. The conductive layer of the multi-layer structure may include at least one metal layer and at least one transparent conductive layer.

The sensor insulating layer 203 may be interposed between the first sensor conductive layer 202 and the second sensor conductive layer 204. The sensor insulating layer 203 may include an inorganic film. The inorganic film may include at least one of aluminum oxide, titanium oxide, silicon oxide, silicon nitride, silicon oxynitride, zirconium oxide, and hafnium oxide.

However, the sensor insulating layer 203 may include an organic film in another embodiment. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, and perylene-based resin.

The sensor cover layer 205 may be disposed on the sensor insulating layer 203 to cover the second sensor conductive layer 204. The second sensor conductive layer 204 may include a conductive pattern. The sensor cover layer 205 may cover the conductive pattern and may reduce or eliminate the probability that the conductive pattern is damaged in a subsequent process. The sensor cover layer 205 may include an inorganic material. For example, the sensor cover layer 205 may include silicon nitride, but is not limited thereto. In an embodiment of the present disclosure, the sensor cover layer 205 is omitted.

The anti-reflection layer 300 may be disposed on the sensor layer 200. The anti-reflection layer 300 may include a division layer 310, a plurality of color filters 320, and a planarization layer 330.

The division layer 310 may be disposed to overlap the conductive pattern of the second sensor conductive layer 204. The sensor cover layer 205 may be interposed between the division layer 310 and the second sensor conductive layer 204. The division layer 310 may prevent external light from being reflected by the second sensor conductive layer 204. The division layer 310 may be made of any material that absorbs light. The division layer 310 may be a layer having a black color. In an embodiment, the division layer 310 includes a black coloring agent. The black coloring agent may include a black dye and a black pigment. The black coloring agent may include carbon black, a metal such as chromium, or an oxide thereof.

A plurality of division openings may be defined in the division layer 310. The plurality of division openings may overlap the light emitting layer EL and the photoelectric conversion layer RL. The color filters 320 may be positioned to correspond to the plurality of division openings. The color filter 320 may transmit light provided from the light emitting layer EL that overlaps the color filter 320. Light may be transmitted through the color filter 320 and provided to the photoelectric conversion layer RL.

The light emitting layer EL may be a green light emitting layer. Accordingly, the one color filter 320 may be provided in common to the light emitting layer EL and the photoelectric conversion layer RL. However, embodiments of the disclosure are not limited thereto. For example, a color filter of a color other than the green color filter may be disposed on the photoelectric conversion layer RL. In an embodiment, the color filter 320 is not disposed on the photoelectric conversion layer RL.

The planarization layer 330 may cover the division layer 310 and the color filters 320. The planarization layer 330 may include an organic material, and may provide a planarization surface on an upper surface of the planarization layer 330. In an embodiment, the planarization layer 330 is omitted.

In an embodiment of the present disclosure, the anti-reflection layer 300 includes a reflection adjustment layer instead of the color filters 320. For example, in the illustration of FIG. 7, the color filters 320 may be omitted, and the reflection adjustment layer may be added at a location where the color filters 320 are omitted. For example, the color filters 320 may be replaced with the reflection adjustment layer. The reflection adjustment layer may selectively absorb light in a partial band among light reflected from inside the display panel and/or an electronic device or light incident from the outside of the display panel and/or the electronic device.

For example, the reflection adjustment layer may absorb light in a first wavelength between 490 nm and 505 nm and light in a second wavelength between 585 nm and 600 nm such that light transmittance in the first wavelength and the second wavelength becomes 40% or less. The reflection adjustment layer may absorb light having a wavelength outside a wavelength range of red, green, and blue light emitted from the light emitting layer EL. As such, the reflection adjustment layer may absorb light having a wavelength that does not belong to a wavelength range of red, green, or blue emitted from the light emitting layer EL, thereby preventing or minimizing a decrease in the luminance of a display panel and/or an electronic device. Besides, the decrease in luminous efficiency of the display panel and/or electronic device may be prevented or minimized, and visibility may be increased at the same time.

The reflection adjustment layer may be formed of an organic material layer including dyes, pigments, or a combination thereof. The reflection adjustment layer may include a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, and a combination thereof.

In an embodiment, the reflection adjustment layer has a transmittance ranging from 64% to 72%. The transmittance of the reflection adjustment layer may be adjusted depending on the amount of pigment and/or dye included in the reflection adjustment layer.

Figure 8:
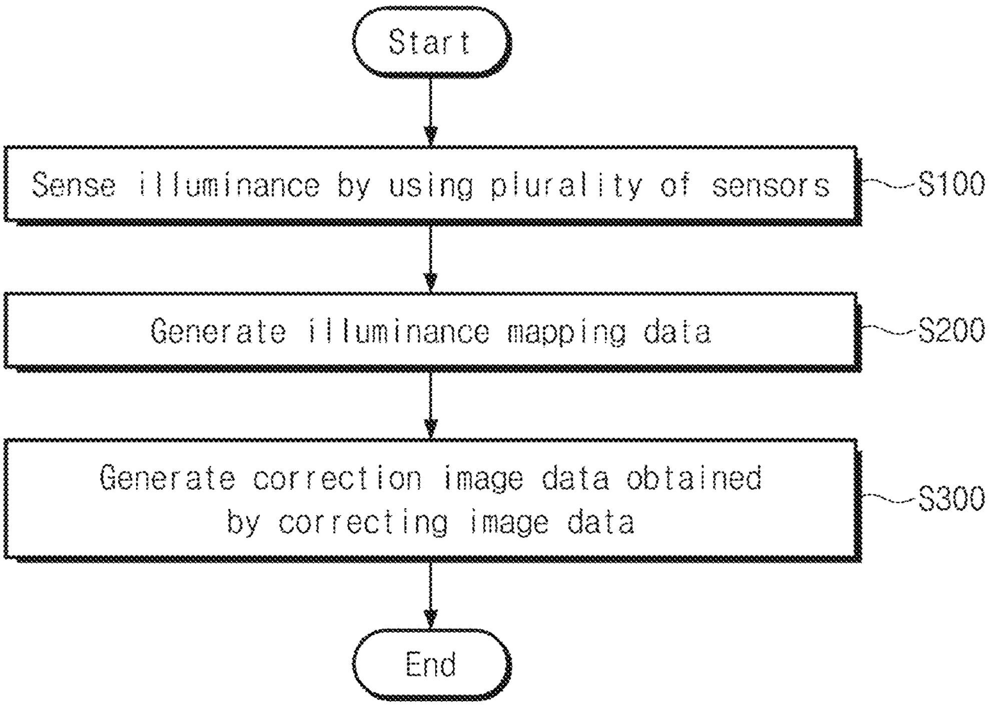
FIG. 8 is a flowchart for describing an operation of a display device, according to an embodiment of the present disclosure.

FIG. 8 is a flowchart for describing an operation of the display device 1000 (see FIG. 4), according to an embodiment of the present disclosure.

Referring to FIGS. 4 and 8, the display device 1000 senses illuminance by using the plurality of sensors FX (S100). For example, a plurality of illuminance values may be sensed by the plurality of sensors FX. For example, each of the sensors FX may sense a respective one of the illuminance values.

The illuminance mapping unit 100C7 generates the illuminance mapping data IDT by mapping the plurality of illuminance values (S200). For example, the illuminance mapping unit 100C7 may generate the illuminance mapping data IDT corresponding to the resolution of the display layer 100 based on the illuminance values measured by the plurality of sensors FX. For example, the illuminance mapping unit 100C7 may generate the illuminance mapping data IDT appropriate for the resolution based on the measured illuminance values.

The correction unit 100C8 may generate the correction image data RGB_C obtained by correcting the image data RGB based on the illuminance mapping data IDT (S300). In an embodiment, the correction unit 100C8 is configured to determine a correction weight according to a location within the display area DA based on the illuminance mapping data IDT. For example, the correction unit 100C8 may be configured to determine a correction weight for each of the plurality of pixels PX and to generate the correction image data RGB_C obtained by correcting the image data RGB based on the correction weights. In another example, the correction unit 100C8 may be configured to determine a correction weight for each of the plurality of areas and to generate the correction image data RGB_C obtained by correcting the image data RGB based on the correction weights.

Figure 9:
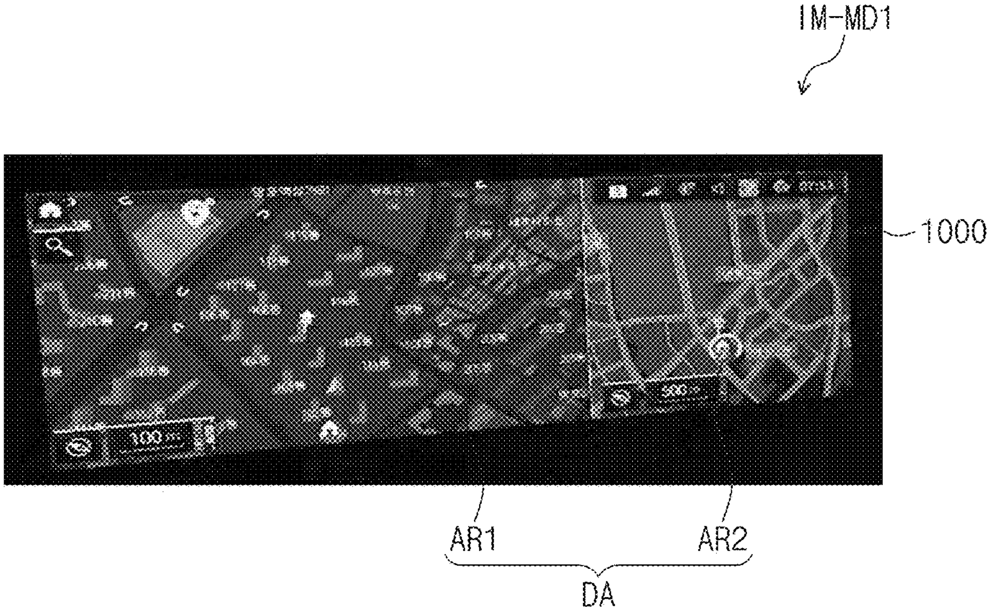
FIG. 9 is an example image obtained by capturing an image of a display device, according to an embodiment of the present disclosure.

FIG. 9 is an image IM-MD1 obtained by capturing an image of the display device 1000, according to an embodiment of the present disclosure.

Referring to FIGS. 1 and 9, the display device 1000 may operate in a first mode. In an embodiment, the first mode is a general driving mode having a first maximum brightness. For example, the first mode may be a mode in which the original image data RGB (see FIG. 4) is displayed.

The display area DA may include a first area AR1 and a second area AR2. In a first mode, a first luminance value of an image corresponding to the first grayscale displayed in the first area AR1 is the same as a second luminance value of an image corresponding to the first grayscale displayed in the second area AR2.

Figure 10:
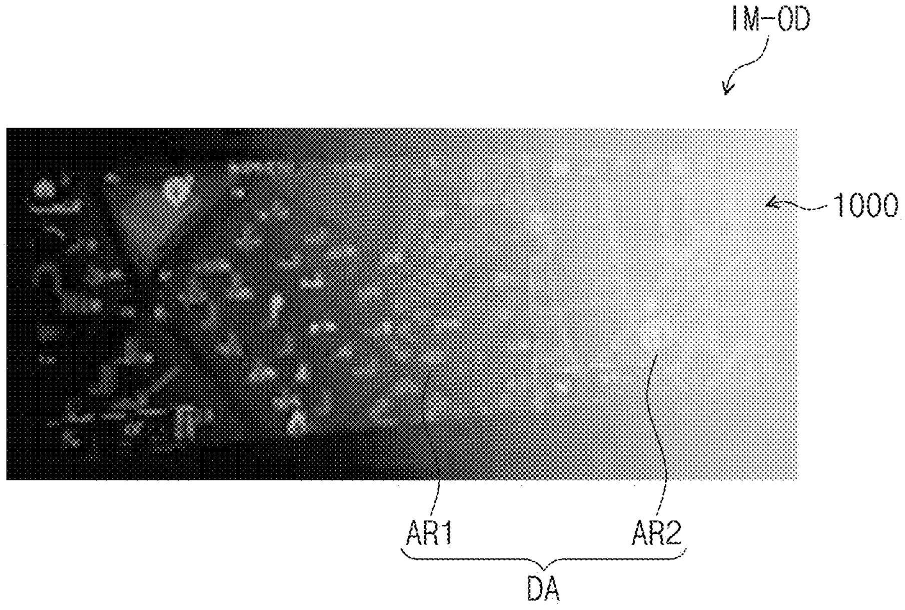
FIG. 10 is an example image obtained by capturing an image of a display device, according to an embodiment of the present disclosure.
Figure 11:
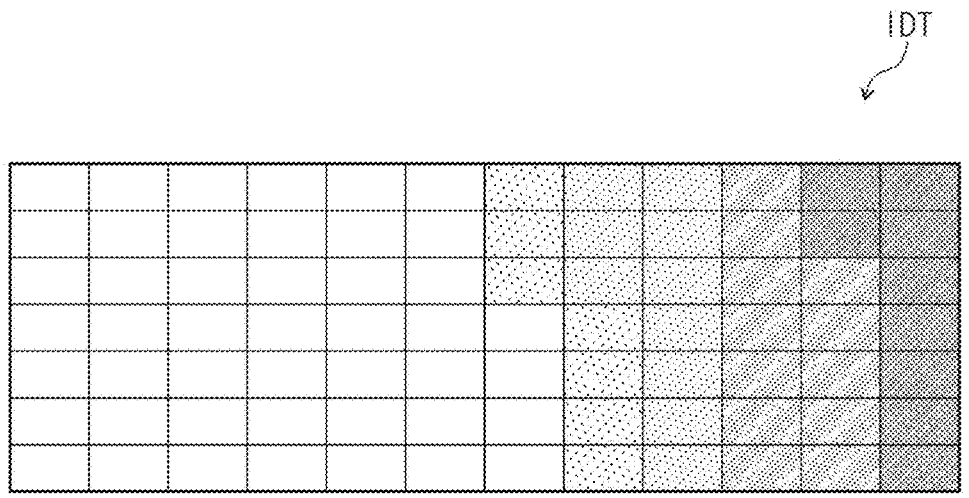
FIG. 11 is a diagram illustrating illuminance mapping data, according to an embodiment of the present disclosure.

FIG. 10 is an image IM-OD obtained by capturing an image of the display device 1000, according to an embodiment of the present disclosure. FIG. 11 is a diagram illustrating the illuminance mapping data IDT, according to an embodiment of the present disclosure.

Referring to FIGS. 4, 10, and 11, external light may be irradiated in a right direction of the display device 1000. In this case, a contrast ratio of a partial area exposed to external light may be lowered in the display device 1000. The contrast ratio may refer to the contrast ratio recognized by the user or observed externally.

According to an embodiment of the present disclosure, a plurality of illuminance values may be respectively sensed by the plurality of sensors FX, and the illuminance mapping data IDT obtained by mapping the plurality of illuminance values may be generated. The illuminance sensed from a right side within the display device 1000 may be different from the illuminance sensed from a left side. In FIG. 11, different hatchings are displayed according to differences in illuminance mapping data (IDT). For example, the higher the measured illuminance, the darker the hatching shown in FIG. 11. In an embodiment, the illuminance mapping data IDT includes a value for each area of the display indicating how much the corresponding area is being illuminated by external light such as sunlight.

Figure 12:
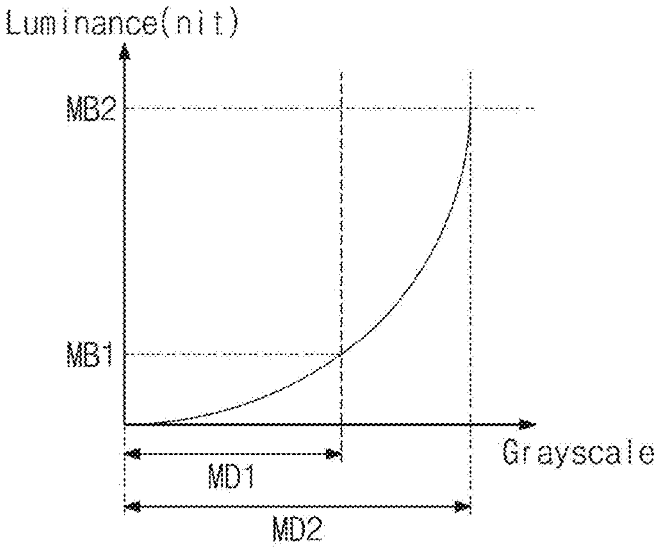
FIG. 12 is a graph illustrating a gamma curve, according to an embodiment of the present disclosure.

FIG. 12 is a graph illustrating a gamma curve, according to an embodiment of the present disclosure.

Referring to FIG. 12, a grayscale range adjusted in a first mode MD1 may be different from a grayscale range adjusted in a second mode MD2. Accordingly, a first maximum value brightness MB1 in the first mode MD1 may be different from a second maximum brightness MB2 in the second mode MD2. For example, when the first maximum brightness MB1 is 500 nit, the second maximum brightness MB2 may be 1,000 nit. However, this is only an example and is not limited thereto. The display device may operate in the first mode MD1 when the display area DA is exposed to external light less than a certain threshold or no part of the display area DA is exposed to external light above the certain threshold.

Referring to FIGS. 11 and 12, the correction weight may vary depending on the detected illuminance value. Even when the same grayscale is input to an area where external light is not exposed, and an area exposed to external light, light may be emitted with different brightness based on whether it is exposed to external light. For example, the illuminance measured in a left area may be lower than the illuminance measured in a right area. Accordingly, a correction weight corresponding to the left area may be lower than a correction weight corresponding to the right area. Accordingly, even when the same grayscale is input, the adjustment may be made with different grayscales based on the exposure to external light. Accordingly, pixels placed in the left area may emit light with brightness equal to or less than the first maximum brightness MB1, and pixels placed in the right area may emit light with brightness equal to or less than the second maximum brightness MB2. The illuminance mapping data IDT may be used to determine whether a pixel is being exposed to too much external light. For example, if the pixel is located in an area of the illuminance mapping data IDT having a value of illuminated light higher than a threshold, then the pixel is considered to be experiencing too much illuminated light and may need to be corrected.

Figure 13:
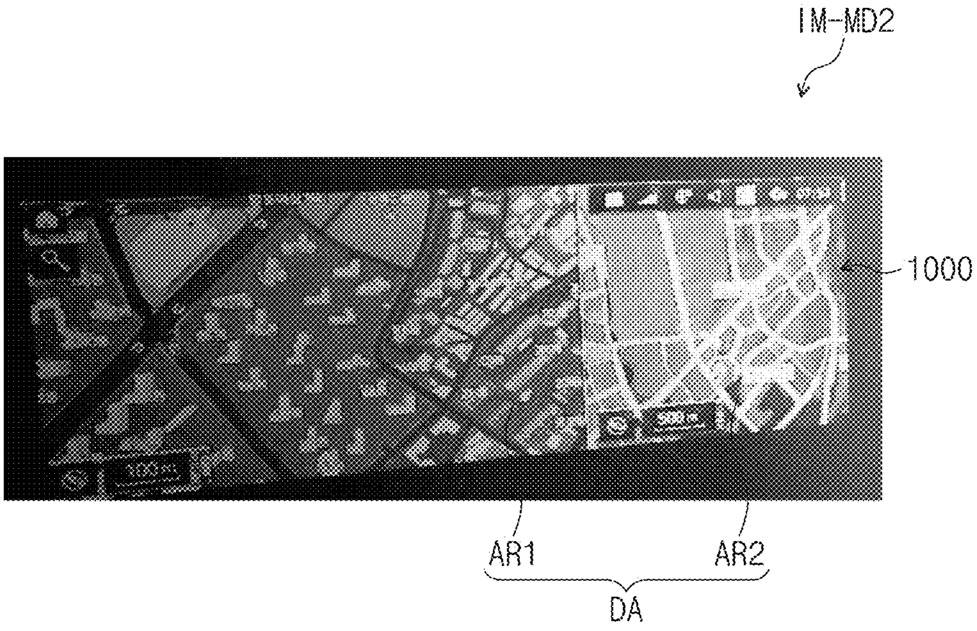
FIG. 13 is an example image obtained by capturing an image of a display device, according to an embodiment of the present disclosure.

FIG. 13 is an image obtained by capturing an image of the display device 1000, according to an embodiment of the present disclosure.

Referring to FIGS. 4, 12, and 13, the display area DA may include the first area AR1 and the second area AR2. The second area AR2 may be an area that is more exposed to external light than the first area AR1.

The display device 1000 may operate in the second mode MD2. In this case, the maximum brightness of the first area AR1, which is relatively less exposed to external light, is not increasingly corrected, and only the maximum brightness of the second area AR2 may be corrected increasingly. In this case, the contrast ratio of the second area AR2 degraded by external light may be optimized. In an embodiment, the display device 1000 operates in the second mode MD2 when it is determined that part of the display area DA is more exposed to external light than another part of the display area DA. In an embodiment, the display area 1000 operates in the second mode MD2 when it is determined that at least part of the display area DA is exposed to external light greater than a certain threshold.

An illuminance value measured by the sensor FX disposed in the first area AR1 may be lower than an illuminance value measured by the sensor FX disposed in the second area AR2. Accordingly, in the second mode MD2, the first luminance value of an image corresponding to the first grayscale displayed in the first area AR1 may be lower than the second luminance value of an image corresponding to the first grayscale displayed in the second area AR2. That is, even when image data having the same grayscale is input, actual displayed brightness may be different depending on the degree of external light exposure.

According to an embodiment of the present disclosure, illuminance may be sensed by using sensors FX distributed and positioned in the display area DA. The display device 1000 may be configured to generate illuminance mapping data, which is obtained by mapping a plurality of illuminance values, and to determine a correction weight based on the illuminance mapping data. That is, even when a deviation in the degree of exposure to external light occurs within the display device 1000, this may be reflected as the correction weight. Accordingly, in addition to optimizing a contrast ratio (CR) due to external light, a brightness increase correction is not performed on a part of a display panel of the display device 1000, which does not need to have its maximum brightness increased. Thus the power consumption of the display device 1000 may be reduced. In addition, because the maximum brightness of only the necessary part is increased, the lifetime of the display device 1000 may be increased.

As described above, a plurality of illuminance values may be sensed by a plurality of sensors positioned in a display area of a display device, and illuminance mapping data obtained by mapping the plurality of illuminance values may be generated. The display device may be configured to determine a correction weight based on the illuminance mapping data. For example, even when the same grayscale is input, the correction weight may vary depending on the detected illuminance value. That is, even when a deviation in the degree of exposure to external light occurs within the display device, this may be reflected as the correction weight. Accordingly, in addition to optimizing a contrast ratio due to external light, a brightness increase correction is not performed on a part of the display panel which does not need its maximum brightness increased. Thus, the power consumption of the display device may be reduced. In addition, because the maximum luminance is increased in only the necessary part, the lifetime of the display device may be increased.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a plurality of pixels and a plurality of sensors, which are positioned in corresponding areas of a display area;

a first logic circuit configured to receive a plurality of illuminance values sensed by the plurality of sensors, and to generate illuminance mapping data by mapping the plurality of illuminance values to each of the areas; and a second logic circuit configured to correct image data corresponding to the plurality of pixels of a given area among the areas based on the illuminance value of the given area in the illuminance mapping data, to generate correction image data for output to the display panel, where each illuminance value corresponds to a light intensity of a corresponding one of the areas, wherein a weight used to generate the correction image data for the given area is greater than that used for another area when the illuminance value of the given area is greater than the illuminance value of the other area.

2. The display device of claim 1, further comprising:

a panel driver configured to control an operation of the display panel; and a driving controller configured to control of an operation of the panel driver, wherein the correction image data is provided to the driving controller.

3. The display device of claim 2, wherein the panel driver includes a data driver, a scan driver, a light emitting driver, and a sensor controller, wherein the data driver, the scan driver, and the light emitting driver control the plurality of pixels, and wherein the scan driver and the sensor controller control the plurality of sensors, and the sensor controller outputs the plurality of illuminance values to the first logic circuit.

4. The display device of claim 1, wherein the second logic circuit is configured to:

determine a correction weight based on the illuminance mapping data.

5. The display device of claim 4, wherein the second logic circuit is configured to:

determine the correction weight for each of the plurality of pixels; and generate the correction image data obtained by correcting the image data based on the correction weight.

6. The display device of claim 4, wherein the second logic circuit is configured to:

determine the correction weight for each of the areas; and generate the correction image data obtained by correcting the image data based on the correction weight.

7. The display device of claim 1, wherein the display panel operates in one of a first mode having a first maximum brightness, and a second mode having a second maximum brightness brighter than the first maximum brightness.

8. The display device of claim 7, wherein, in the second mode, a first luminance value of an image corresponding to a first grayscale displayed in a first area among the areas is lower than a second luminance value of an image corresponding to the first grayscale displayed in a second area among the areas.

9. The display device of claim 8, wherein an illuminance value measured in the first area is lower than an illuminance value measured in the second area.

10. The display device of claim 1, wherein each of the plurality of pixels includes a pixel driving circuit and a light emitting element, and wherein each of the plurality of sensors includes a sensor driving circuit and a sensing element.

11. The display device of claim 10, wherein the sensing element is an organic photodiode.

12. The display device of claim 1, wherein a number of the plurality of pixels is greater than a number of the plurality of sensors.

13. The display device of claim 1, wherein the display panel is an in-vehicle display panel.

14. A display device comprising:

a display panel including a plurality of pixels and a plurality of sensors, which are positioned in a display area; and a first logic circuit configured to:

determine a correction weight according to a location within the display area based on a plurality of illuminance values sensed by the plurality of sensors; and generate correction image data by correcting image data corresponding to the plurality of pixels based on the correction weight for output to the display panel, wherein the first logic circuit is configured to:

determine the correction weight for each of the plurality of pixels; and generate the correction image data by correcting the image data based on the correction weight.

15. The display device of claim 14, further comprising:

a second logic circuit configured to:

generate illuminance mapping data by mapping the plurality of illuminance values to each of the pixels, wherein the first logic circuit is configured to:

determine the correction weight based on the illuminance mapping data.

16. The display device of claim 14, wherein the display panel operates in one of a first mode having a first maximum brightness, and a second mode having a second maximum brightness brighter than the first maximum brightness, wherein the display area includes a first area and a second area, wherein, in the second mode, a first luminance value of an image corresponding to a first grayscale displayed in the first area is lower than a second luminance value of an image corresponding to the first grayscale displayed in the second area, and wherein an illuminance value measured in the first area is lower than an illuminance value measured in the second area.

17. An electronic device comprising a display device comprising:

a display panel including a plurality of pixels and a plurality of sensors, which are positioned in a display area including a first area and a second area, and configured to operate in one of a first mode having a first maximum brightness, and a second mode having a second maximum brightness brighter than the first maximum brightness; and a first logic circuit configured to correct image data corresponding to the plurality of pixels based on a plurality of illuminance values sensed by the plurality of sensors to generate correction image data for output to the display panel, wherein, in the second mode, the correction image data for the second area is generated such that a brightness increase applied to the second area is greater than a brightness increase applied to the first area when a measured light intensity in the second area is greater than a measured light intensity in the first area.

18. The electronic device of claim 17, further comprising:

a second logic circuit configured to: generate illuminance mapping data by mapping the plurality of illuminance values to each of the pixels, wherein the first logic circuit is configured to: determine a correction weight according to a location within the display area based on the illuminance mapping data.

* * * * *